(12) United States Patent
Frenne et al.

(10) Patent No.: US 11,245,449 B2
(45) Date of Patent: Feb. 8, 2022

(54) NETWORK NODE, WIRELESS DEVICE AND METHODS THEREBY TO INDICATE A FIRST SET OF ANTENNA PORTS AND A SECOND SET OF ANTENNA PORTS

(71) Applicant: Telefonaktiebolaget LM Ericsson (publ), Stockholm (SE)

(72) Inventors: Mattias Frenne, Uppsala (SE); Shiwei Gao, Nepean (CA); Robert Mark Harrison, Grapevine, TX (US); George Jöngren, Sundbyberg (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 170 days.

(21) Appl. No.: 15/758,541

(22) PCT Filed: Sep. 13, 2016

(86) PCT No.: PCT/SE2016/050855
§ 371 (c)(1),
(2) Date: Mar. 8, 2018

(87) PCT Pub. No.: WO2017/048178
PCT Pub. Date: Mar. 23, 2017

(65) Prior Publication Data
US 2018/0278312 A1     Sep. 27, 2018

Related U.S. Application Data

(60) Provisional application No. 62/217,985, filed on Sep. 14, 2015, provisional application No. 62/217,993, filed on Sep. 14, 2015.

(51) Int. Cl.
*H04B 7/06*     (2006.01)
*H04W 24/10*    (2009.01)
(Continued)

(52) U.S. Cl.
CPC ......... *H04B 7/0626* (2013.01); *H04L 1/0023* (2013.01); *H04L 5/0023* (2013.01);
(Continued)

(58) Field of Classification Search
CPC .... H04W 40/06; H04W 24/10; H04B 7/0626; H04L 1/0693
See application file for complete search history.

(56) References Cited

U.S. PATENT DOCUMENTS 9,918,240 B2 * 3/2018 Lee ...................... H04B 7/0639
10,033,507 B2 * 7/2018 Yum ........................ H04B 7/06
(Continued)

FOREIGN PATENT DOCUMENTS

WO      2015 060680 A2     4/2015

OTHER PUBLICATIONS

PCT International Preliminary Report on Patentability for International application No. PCT/SE2016/050855—dated Mar. 20, 2018.
(Continued)

*Primary Examiner* — Ashley Shivers
(74) *Attorney, Agent, or Firm* — Sage Patent Group

(57) ABSTRACT

Method performed by a network node (210) to indicate a first and a second set of antenna ports. The network node (210) indicates (803) to a wireless device (250) at least one of: a) a first indication of a first set (M') of antenna ports for first measurements on first radio signals, the first measurements associated with periodic reporting, and b) a second indication of a second set (M) of antenna ports for second measurements on second radio signals, the second measurements associated with aperiodic reporting. The first set is different than the second set. The periodic and the aperiodic reporting are by the wireless device (250) and correspond to a same Channel State Information, CSI, process. The network node (210) also transmits (804), to the wireless device
(Continued)

(250), the first radio signals, periodically, over the first set and the second radio signals over the second set.

22 Claims, 12 Drawing Sheets

(51) Int. Cl.
  *H04L 1/00* (2006.01)
  *H04L 5/00* (2006.01)
(52) U.S. Cl.
  CPC .......... *H04L 5/0048* (2013.01); *H04L 5/0053* (2013.01); *H04L 5/0092* (2013.01); *H04W 24/10* (2013.01); *H04L 1/0026* (2013.01)

(56) References Cited

U.S. PATENT DOCUMENTS

| | | | | |
|---|---|---|---|---|
| 10,136,337 | B2* | 11/2018 | Park | H04B 7/0626 |
| 10,505,608 | B2* | 12/2019 | Kim | H04L 5/0048 |
| 10,659,126 | B2* | 5/2020 | Kim | H04B 7/0639 |
| 2012/0281567 | A1 | 11/2012 | Gao et al. | |
| 2013/0322376 | A1 | 12/2013 | Marinier et al. | |
| 2014/0192917 | A1 | 7/2014 | Nam et al. | |
| 2014/0307631 | A1* | 10/2014 | Miao | H04L 1/0029 370/328 |
| 2015/0341091 | A1* | 11/2015 | Park | H04B 7/0617 375/267 |
| 2016/0119947 | A1* | 4/2016 | Park | H04B 7/024 370/329 |
| 2016/0211902 | A1 | 7/2016 | Park et al. | |
| 2017/0164226 | A1* | 6/2017 | Wei | H04L 5/0023 |
| 2018/0167117 | A1* | 6/2018 | Liu | H04B 7/063 |
| 2018/0294847 | A1* | 10/2018 | Lee | H04B 7/0417 |

OTHER PUBLICATIONS

PCT International Search Report for International application No. PCT/SE2016/050855—dated Nov. 22, 2016.

PCT Written Opinion of the International Searching Authority for International application No. PCT/SE2016/050855—dated Nov. 22, 2016.

Office Action issued in corresponding EP Application No. 16774559.5; dated Feb. 27, 2019; 04 pages.

European Office Action issued in corresponding EP Application No. 16774559.5 dated Sep. 22, 2020, 06 Pages.

PCT International Search Report for International application No. PCT/SE2016/050855—dated Nov. 15, 2016.

PCT Written Opinion of the International Searching Authority for International application No. PCT/SE2016/050855—dated Nov. 15, 2016.

* cited by examiner (a) 2x4 port layout     (b) 4x2 port layout

NETWORK NODE, WIRELESS DEVICE AND METHODS THEREBY TO INDICATE A FIRST SET OF ANTENNA PORTS AND A SECOND SET OF ANTENNA PORTS

PRIORITY

This nonprovisional application is a U.S. National Stage Filing under 35 U.S.C. § 371 of International Patent Application Serial No. PCT/SE2016/050855 filed Sep. 13, 2016, and entitled "Network Node, Wireless Device and Methods Thereby to Indicate a First Set of Antenna Ports and a Second Set of Antenna Ports which claims priority to U.S. Provisional Patent Application No. 62/217,985 filed Sep. 14, 2015 and U.S. Provisional Patent Application No. 62/217,993 filed Sep. 14, 2015, all of which are hereby incorporated by reference in their entirety.

TECHNICAL FIELD

The present disclosure relates generally to a network node and methods performed thereby to indicate to a wireless device a first set of antenna ports and a second set of antenna port. The present disclosure also relates generally to the wireless device and methods performed thereby to receive the indication from the network node. The present disclosure further relates generally to a computer program product, comprising instructions to carry out the actions described herein, as performed by the network node, or by the wireless device. The computer program product may be stored on a computer-readable storage medium.

BACKGROUND

Communication devices such as wireless devices are also known as e.g. User Equipments (UEs), terminals, mobile terminals, wireless terminals and/or mobile stations. Wireless devices are enabled to communicate wirelessly in a wireless communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the wireless communications network.

Wireless devices may further be referred to as mobile telephones, cellular telephones, laptops, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The wireless communications network covers a geographical area which may be divided into cell areas, wherein each cell area being served by an access node such as a network node or base station, e.g. a Radio Base Station (RBS), which sometimes may be referred to as e.g. evolved NodeB "eNB", "eNodeB", "NodeB", "B node", or BTS (Base Transceiver Station), depending on the technology and terminology used. The network nodes may be of different classes such as e.g. macro eNodeB, home eNodeB or pico base station, based on transmission power and thereby also cell size. A cell is the geographical area where radio coverage is provided by the network node at a network node site. One network node, situated on the network node site, may serve one or several cells. Further, each network node may support one or several communication technologies. The wireless communications network may also be a non-cellular system, comprising network nodes which may serve receiving nodes, such as wireless devices, with serving beams. The network nodes communicate over the air interface operating on radio frequencies with the wireless devices within range of the network nodes. In the context of this disclosure, the expression Downlink (DL) is used for the transmission path from the network node to the wireless device. The expression Uplink (UL) is used for the transmission path in the opposite direction i.e. from the wireless device to the network node.

In 3rd Generation Partnership Project (3GPP) Long Term Evolution (LTE), network nodes, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The present disclosure addresses aspects of transmission in LTE, for which a background description is provided below. In particular, aspects of transmission using multi-antenna techniques are described.

DL and UL Transmission in LTE

LTE may use OFDM in the downlink and Discrete Fourier Transform (DFT)-spread Orthogonal Frequency Division Multiplexing (OFDM) in the uplink. The basic LTE downlink physical resource may thus be seen as a time-frequency grid as illustrated in the schematic diagram of FIG. 1, where each resource element corresponds to one OFDM subcarrier during one OFDM symbol interval.

In the time domain, LTE DL transmissions may be organized into radio frames of 10 milliseconds (ms), each radio frame consisting of ten equally-sized subframes of length $T_{subframe}=1$ ms, as illustrated in the schematic diagram of FIG. 2.

Furthermore, the resource allocation in LTE may be typically described in terms of resource blocks, where a resource block corresponds to one slot, that is 0.5 ms, in the time domain and 12 contiguous subcarriers in the frequency domain. Resource blocks may be numbered in the frequency domain, starting with 0 from one end of the system bandwidth.

Downlink transmissions may be dynamically scheduled, that is, in each subframe the base station may transmit control information about which terminals data is transmitted to, and upon which resource blocks the data is transmitted, in the current downlink subframe. This control signaling may be typically transmitted in the first 1, 2, 3 or 4 OFDM symbols in each subframe. A downlink system with 3 OFDM symbols as control region is illustrated in the schematic diagram of FIG. 3. The control region in FIG. 3 is shown as comprising control signaling, indicated by black squares, reference signals, which may also be referred to as reference symbols, indicated by striped squares, and unused symbols, indicated by dotted squares. The reference signals shown in the above FIG. 3 may be the Cell-specific Reference Signals (CRS) and they may be used to support multiple functions including fine time and frequency synchronization and channel estimation for certain transmission modes.

LTE may use hybrid-Automatic Repeat reQuest (ARQ), according to which, after receiving downlink data in a subframe, a terminal may attempt to decode it and may report to the base station whether the decoding was successful with an ACKnowledgment (ACK) or not with a Negative ACKnowledgment (NAK). In case of an unsuccessful decoding attempt, the base station may retransmit the erroneous data.

Uplink control signaling from the terminal to the base station may comprise: a) hybrid-ARQ acknowledgements for received downlink data; b) terminal reports related to the downlink channel conditions, used as assistance for the downlink scheduling; c) scheduling requests, indicating that a mobile terminal needs uplink resources for uplink data transmissions.

If the mobile terminal has not been assigned an uplink resource for data transmission, the control information of Layer 1 (L1) and/or Layer 2 (L2), such as channel-status reports, hybrid-ARQ acknowledgments, and scheduling requests, may be transmitted in uplink resources, e.g., resource blocks specifically assigned for uplink L1/L2 control on the Physical Uplink Control CHannel (PUCCH). As illustrated in the schematic diagram of FIG. 4, these resources may be located at the edges of the total available cell bandwidth. Each such resource may consist of twelve "subcarriers", one resource block, within each of the two slots of an uplink subframe. In order to provide frequency diversity, these frequency resources may be frequency hopping on the slot boundary, i.e. one "resource" may consist of 12 subcarriers at the upper part of the spectrum within the first slot of a subframe, and an equally sized resource at the lower part of the spectrum during the second slot of the subframe or vice versa. If more resources are needed for the uplink L1/L2 control signaling, e.g. in case of very large overall transmission bandwidth supporting a large number of users, additional resource blocks may be assigned next to the previously assigned resource blocks.

As mentioned above, uplink L1/L2 control signaling may include hybrid-ARQ acknowledgements, channel-status reports and scheduling requests. Different combinations of these types of messages may be possible as described further below, but to explain the structure for these cases it is beneficial to discuss separate transmission of each of the types first, starting with the hybrid-ARQ and the scheduling request. There may be three formats that may be defined for PUCCH, each capable of carrying a different number of bits. For this background, PUCCH format 2 may be of particular interest.

PUCCH Format 2

Channel-status reports may be used to provide an eNodeB with an estimate of the channel properties at a terminal in order to aid channel-dependent scheduling. A channel-status report may consist of multiple bits per subframe. PUCCH format 1, which is capable of at most two bits of information per subframe, may not be used for this purpose. Transmission of channel-status reports on the PUCCH may instead be handled by PUCCH format 2, which is capable of multiple information bits per subframe. There may actually be three variants in the LTE specifications, formats 2, 2a and 2b, where the last two formats may be used for simultaneous transmission of hybrid-ARQ acknowledgements as discussed later in this section. However, for simplicity, they are all referred to herein as format 2.

The PUCCH format 2 resources may be semi-statically configured.

Multi-Antenna Techniques and Codebook-Based Precoding

Multi-antenna techniques may significantly increase the data rates and reliability of a wireless communication system. The performance may be in particular improved if both the transmitter and the receiver are equipped with multiple antennas, which results in a Multiple-Input Multiple-Output (MIMO) communication channel. Such systems and/or related techniques are commonly referred to as MIMO.

The LTE standard is currently evolving with enhanced MIMO support. A component in LTE may be the support of MIMO antenna deployments and MIMO related techniques. Currently, LTE-Advanced may support an 8-layer spatial multiplexing mode for 8 Tx antennas with channel dependent precoding. The spatial multiplexing mode is aimed for high data rates in favorable channel conditions. Spatially multiplexing in different layers may be understood as transmitting multiple data streams over different beams, each pointing at different directions, such that each data stream may reach a receiver through a distinct radio path and may be separated from the other data streams at the receiver. Each of the distinct radio paths may be considered as a layer. In spatial multiplexing, each layer is associated with a unique reference signal for demodulation. An illustration of the spatial multiplexing operation is provided in the schematic diagram of FIG. 5. A precoding vector, used to form a beam, may be associated with each layer.

As illustrated in FIG. 5, the information carrying symbol vector $s=[s(1), s(2), \ldots, s(r)]$ may be multiplied by an $N_T \times r$ precoder matrix W, which may serve to distribute the transmit energy in a subspace of the $N_T$ dimensional vector space, $N_T$ corresponding to $N_T$ antenna ports. Each of the $N_T$ antenna ports may be associated with a unique reference signal. Each antenna port may be understood to be associated with a unique reference signal in identifying the antenna port. Therefore, transmitting two radio signals, for example LTE physical signals or physical channels, over an antenna port may comprise transmitting the radio signals through an antenna element, or set of antenna elements, such that they may be perceived by a receiver as propagating through the same radio propagation channel. Given this association of an antenna port with a reference signal, an antenna port may be understood as being equivalent to a transmitted reference signal. An example of antenna ports may be found in 3GPP TS 36.211, section 6.10.5. When a receiver estimates the channel associated with a reference signal, the channel from that antenna port may be said to be estimated. In the example shown in FIG. 5, the information symbol s may be transmitted from $N_T$ antenna ports. The receiver may use the reference signal associated with each of the $N_T$ antenna ports to estimate the corresponding channels, and use the channel estimates to demodulate the information s. The precoder matrix may be typically selected from a codebook of possible precoder matrices, and may be typically indicated by means of a Precoder Matrix Indicator (PMI), which may specify a unique precoder matrix in the codebook for a given number of symbol streams. Each of the r symbols in $s=[s(1), s(2), \ldots, s(r)]$ corresponds to a layer and r may be referred to as the transmission rank. In this way, spatial multiplexing may be achieved since multiple symbols may be transmitted simultaneously over the same Time/Frequency Resource Element (TFRE), which may also be referred to as a Resource Element (RE). The number of symbols r may be typically adapted to suit the current channel properties. That is, the number of symbols r may be typically adapted to match the number of layers that may be carried in the current channel.

LTE may use OFDM in the downlink, and Discrete Fourier Transform (DFT) precoded OFDM in the uplink, and hence the received $N_R \times 1$ vector $y_n$ for a certain TFRE on subcarrier n, or alternatively data TFRE number n, where $N_R$ is the number of receiver antennas or receiver radio chains, may thus be modeled by $$y_n = H_n W s_n + e_n$$

where $e_n$ is a noise/interference vector that may be obtained as realizations of a random process, $s_n = [s_n(1), \ldots, s_n(r)]$ is the transmitted symbols; W is an $N_T \times r$ precoder matrix, which may be a wideband precoder, that is, it may be constant over frequency, or a frequency selective or channel dependent precoder, i.e., it may vary over frequency; $H_n$ is a $N_R \times N_T$ channel matrix representing the MIMO channel over the subcarrier, or TFRE.

The precoder matrix may often be chosen to match the characteristics of the $N_R \times N_T$ MIMO channel matrix $H_n$, resulting in so-called channel dependent precoding. This may be also commonly referred to as closed-loop precoding and may strive for focusing the transmit energy into a subspace which is strong in the sense of conveying much of the transmitted energy to the User Equipment (UE). In addition, the precoder matrix may also be selected to strive for orthogonalizing the channel, meaning that after proper linear equalization at the UE, the inter-layer interference may be reduced.

The transmission rank, and thus the number of spatially multiplexed layers, may be reflected in the number of columns of the precoder. For efficient performance, a transmission rank that matches the channel properties may be selected.

Channel State Information Reference Signal (CSI-RS)

In LTE Release-10, a new reference signal sequence was introduced for the intent to estimate channel state information, the CSI-RS. Each CSI-RS may be transmitted on an antenna port. The CSI-RS may provide several advantages over basing the CSI feedback on the Cell-specific Reference Signals (CRS) which were used, for that purpose, in previous releases. Firstly, the CSI-RS may not be used for demodulation of the data signal, and thus may not require the same density, i.e., the overhead of the CSI-RS may be substantially less. Secondly, CSI-RS may provide a much more flexible means to configure CSI feedback measurements, e.g., which CSI-RS resource to measure on may be configured in a UE-specific manner.

By measuring on a CSI-RS, a UE may estimate the effective channel the CSI-RS may be traversing including the radio propagation channel and antenna gains. In more mathematical rigor, this implies that if a known CSI-RS signal x is transmitted, a UE may estimate the coupling between the transmitted signal and the received signal, that is, the overall channel including the effect of transmit and receive antenna gains, i.e., the effective channel. Hence, if no antenna virtualization is performed in the transmission, the received signal y may be expressed as:

$$y = Hx + e$$

and the UE may estimate the effective channel H.

Up to eight antenna ports, and therefore eight associated CSI-RS, may be configured for a Rel.11 UE, that is, the UE may thus estimate the channel from up to eight transmit antenna ports.

Implicit CSI Feedback

For CSI feedback, LTE may adopt an implicit CSI mechanism where a UE does not explicitly report e.g., the complex valued elements of a measured effective channel, but rather the UE may recommend a transmission configuration for the measured effective channel. The recommended transmission configuration may thus implicitly give information about the underlying channel state.

In LTE, the CSI feedback may be given in terms of a transmission Rank Indicator (RI), a Precoder Matrix Indicator (PMI), and one or two Channel Quality Indicator(s) (CQI). The CQI/RI/PMI report may be wideband or frequency selective depending on which reporting mode may be configured.

The RI may correspond to a recommended number of streams or layers that are to be spatially multiplexed and may thus transmitted in parallel over the effective channel. The PMI may identify a recommended precoder, in a codebook which may contain precoders with the same number of rows as the number of antenna ports, e.g. CSI-RS, for the transmission, which may relate to the spatial characteristics of the effective channel. The CQI may represent a recommended transport block size, i.e., code rate, and LTE may support transmission of one or two simultaneous transmissions, on different layers, of transport blocks, i.e. separately encoded blocks of information, to a UE in a subframe. There may be thus a relation between a CQI and an Signal to Interference plus Noise Ratio (SINR) of the spatial stream(s) over which the transport block or blocks may be transmitted.

CSI Process

In LTE Release 11, the term CSI process is introduced, used in transmission mode 10, where each CSI process may be associated with a CSI reference resource and a "flow" of CSI reports from the UE. A CSI process may be defined such that each CSI process may be associated with a CSI-RS resource and a CSI-Interference Measurement (IM) resource. A UE in transmission mode 10 may be configured with one or more, up to four, CSI processes per serving cell by higher layers, and each CSI reported by the UE may correspond to a CSI process. A UE of Release 11 or later may be configured with multiple CSI processes, each of them corresponding to one eNB transmission hypothesis, that is, an assumption on which set of antenna ports the eNB may use to transmit data to a UE and on the interference the UE may experience. This may allow the UE to measure and report CSI for multiple eNB in parallel. Hence, the serving eNB may subsequently choose to schedule the UE from one of these other eNBs, in order to achieve coordination benefits. This may be sometimes also called dynamic point selection. A UE may be configured with a RI-reference CSI process for any CSI process, such that the reported RI for the CSI process is the same as for the RI-reference CSI process. This configuration may be used to force a UE to report the same RI for several different interference hypotheses, e.g., different interference assumptions by using different CSI-Interference Measurement (IM) resource configurations, even though another RI may be the best choice for some hypotheses. Furthermore, a UE may be restricted to report PMI and RI within a precoder codebook subset configured for each CSI process by higher layer signaling. This configuration may also be used to force a UE to report a specific rank for a certain CSI process.

CSI Reporting

For CSI reporting, both periodic and aperiodic, that is, triggered by eNB, reports may be supported, known as P-CSI and A-CSI respectively. Periodic reporting is understood as occurring with a certain periodicity or at regular time periods, whereas aperiodic reporting is understood as not occurring with a certain periodicity, but occurring at irregular time periods, e.g., when triggered by a network node, such as an eNB. In the CSI process, a set of CSI-RS ports may be configured for which the UE may perform measurements. These CSI-RS ports may be configured to be periodically transmitted with 5 ms, 10 ms, 9 ms etc periodicity. The periodic report may be using PUCCH format 2, or its variants (2a,2b) and may have a configured periodicity as well, e.g. 20 ms, and may be a narrow bit pipe, containing at most 11 bits.

2 Dimensional (2D) Antenna Arrays

Recent development in 3GPP has led to the discussion of two-dimensional antenna arrays, where each antenna element may have an independent phase and amplitude control, thereby enabling beamforming in both the vertical and the horizontal dimensions. Such antenna arrays may be, partly, described by the number of antenna columns corresponding to the horizontal dimension $N_h$, the number of antenna rows corresponding to the vertical dimension $N_v$, and the number of dimensions corresponding to different polarizations $N_p$. The total number of antennas may thus be $N=N_h N_v N_p$. An example of an antenna where $N_h=4$ and $N_v=8$ is illustrated in the schematic representation of the left side of FIG. 6, which will be further described later. It may furthermore consist of cross-polarized antenna elements meaning that $N_p=2$. Each of the cross-polarized antenna elements is represented in FIG. 6 by a diagonal line, such that an antenna element with the two polarizations is represented by a cross of diagonal lines. Such an antenna is denoted herein as an 8×4 antenna array with cross-polarized antenna elements.

However, from a standardization perspective, the actual number of elements in an antenna array may not be visible, that is, observable or known, to the UE, but rather the antenna ports, where each port may correspond to a CSI reference signal. The UE may thus measure the channel from each of these ports. Therefore, a 2D port layout is introduced herein, which may be described by the number of antenna ports in the horizontal dimension $M_h$, the number of antenna rows corresponding to the vertical dimension $M_v$ and the number of dimensions corresponding to different polarizations $M_p$. The total number of antenna ports may thus be $M=M_h M_v M_p$. The mapping of these ports on to the N antenna elements may be understood as being related to an eNB implementation and thus not be visible by the UE. Each antenna port may for instance be mapped to two or four antenna elements out of the total N antenna elements, known as a subarray. The UE may not even know the value of N; it may only know the value of the number of ports M. This mapping of antenna ports onto physical antenna elements may be known as antenna virtualization, and may be transparent to the UE, but part of the eNB design. The set of antennas that a single antenna port is using may be denoted a sub-array. The virtualization may be described by a precoding weight vector, or a matrix, which may describe how the phase and amplitude may be adjusted for each antenna within the subarray.

As mentioned earlier, FIG. 6 is a schematic diagram illustrating, on the left side, a two-dimensional antenna array of cross-polarized antenna elements ($N_p=2$), with $N_h=4$ horizontal antenna elements and $N_v=8$ vertical antenna elements. In the figure to the right, the actual port layout with 2 vertical ports and 4 horizontal ports is schematically represented. This may for instance be obtained by virtualizing each port by 4 vertical antenna elements, i.e. the subarray have dimensions 4×1 in this example. The virtualization may use a different complex valued weights, per antenna elements, and may be seen as a precoding within the sub-array. Hence, assuming cross-polarized ports may be present, the UE will measure 16 antenna ports in this example.

Precoding may be interpreted as multiplying a signal with different beamforming weights for each antenna port prior to transmission. A typical approach may be to tailor the precoder to the antenna form factor, i.e. taking into account $M_h$, $M_v$ and $M_p$ when designing the precoder codebook.

An approach when designing precoder codebooks tailored for 2D antenna arrays may be to combine precoders tailored for a horizontal array and a vertical array of antenna ports respectively by means of a Kronecker product. This means that, at least part of, the precoder may be described as a function of:

$$W_H \otimes W_V$$

where $W_H$ is a horizontal precoder taken from a (sub)-codebook $X_H$ containing $N_H$ codewords, note that here $N_H$ is not the same as $N_h$, and similarly $W_V$ is a vertical precoder taken from a (sub)-codebook $X_V$ containing $N_V$ codewords. Note also that $N_V$ is not the same as $N_v$. The joint codebook, denoted by $X_H \otimes X_V$, thus may contain $N_H \cdot N_V$ codewords. The codewords of $X_H$ may be indexed with $k=0, \ldots, N_H-1$, the codewords of $X_V$ may be indexed with $l=0, \ldots, N_V-1$ and the codewords of the joint codebook $X_H \otimes X_V$ may be indexed with $m=N_V k+l$ meaning that $m=0, \ldots, N_H \cdot N_V-1$.

For Rel-12 UE and earlier, only a codebook feedback for a 1D port layout may be supported, with 2, 4 or 8 antenna ports. Hence, the codebook may be designed assuming these ports are arranged on a straight line.

Existing communication methods in LTE using arrays with a large number of antennas are associated with wastage of resources, and also with unnecessary energy consumption in network nodes, as well as in wireless devices that for example may need to perform measurements. During this type of communications, for example, unnecessary transmissions and measurements may occur, delaying transmission of other data and wasting resources, all resulting in loss of channel efficiency, and in turn degraded communication.

SUMMARY

It is an object of the embodiments herein to improve the efficiency of communication methods in reporting of channel conditions by a wireless device to a network node.

According to a first aspect of embodiments herein, the object is achieved by a method performed by a network node. The method is to indicate to a wireless device a first set of antenna ports and a second set of antenna ports. The network node indicates, to the wireless device, at least one of: a) a first indication and b) a second indication. The first indication is of a first set, M', of antenna ports for first measurements by the wireless device on first radio signals. The first measurements are associated with periodic reporting by the wireless device. The second indication is of a second set, M, of antenna ports for second measurements by the wireless device on second radio signals. The second measurements are associated with aperiodic reporting by the wireless device. The first set of antenna ports is different than the second set of antenna ports. The periodic reporting and the aperiodic reporting correspond to a same CSI process. The network node transmits, to the wireless device, the first radio signals, periodically, over the first set of antenna ports. The network node also transmits, to the wireless device, the second radio signals over the second set of antenna ports.

According to a second aspect of embodiments herein, the object is achieved by a method performed by the wireless device. The method is to configure the wireless device with the first set of antenna ports, and the second set of antenna ports. The wireless device receives from the network node, at least one of: a) a first indication and b) a second indication. The first indication is of the first set, M', of antenna ports for the first measurements by the wireless device on the first radio signals. The first measurements are associated with the periodic reporting by the wireless device. The second indication is of the second set, M, of antenna ports for the second measurements by the wireless device on the second radio signals. The second measurements are associated with aperiodic reporting by the wireless device. The first set of antenna ports is different than the second set of antenna ports. The periodic reporting and the aperiodic reporting correspond to the same CSI process. The wireless device configures the wireless device with the first set of antenna ports, and the second set of antenna ports. This is performed according to the received at least one of: the first indication and the second indication.

According to a third aspect of embodiments herein, the object is achieved by the network node configured to indicate to a wireless device the first set of antenna ports and the second set of antenna ports. The network node is configured to indicate to the wireless device at least one of: a) the first indication and b) the second indication. The first indication is of the first set, M', of antenna ports for the first measurements by the wireless device on the first radio signals. The first measurements are associated with periodic reporting by the wireless device. The second indication is of the second set, M, of antenna ports for the second measurements by the wireless device on the second radio signals. The second measurements are associated with aperiodic reporting by the wireless device. The first set of antenna ports is different than the second set of antenna ports. The periodic reporting and the aperiodic reporting correspond to a same CSI process. The network node is also configured to transmit, to the wireless device, the first radio signals, periodically, over the first set of antenna ports. The network node is also configured to transmit the second radio signals over the second set of antenna ports.

According to a fourth aspect of embodiments herein, the object is achieved by the wireless device configured to configure the wireless device with the first set of antenna ports, and the second set of antenna ports. The wireless device is further configured to receive from the network node, at least one of: a) the first indication and b) the second indication. The first indication is of the first set, M', of antenna ports for the first measurements by the wireless device on the first radio signals. The first measurements are associated with the periodic reporting by the wireless device. The second indication of the second set, M, of antenna ports for the second measurements by the wireless device on the second radio signals. The second measurements are associated with the aperiodic reporting by the wireless device. The first set of antenna ports is different than the second set of antenna ports. The periodic reporting and the aperiodic reporting correspond to the same CSI process. The wireless device is further configured to configure the wireless device with the first set of antenna ports, and the second set of antenna ports. This is performed according to the at least one of: the first indication and the second indication, which is configured to be received.

According to a fifth aspect of embodiments herein, the object is achieved by a computer program. The computer program comprises instructions which, when executed on at least one processor, cause the at least one processor to carry out the method performed by the network node.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the network node.

According to a seventh aspect of embodiments herein, the object is achieved by a computer program. The computer program comprises instructions which, when executed on at least one processor, cause the at least one processor to carry out the method performed by the wireless device.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the wireless device.

By the network node transmitting the first radio signals, periodically, over the first set of antenna ports and the second radio signals over the second set of antenna ports, low complexity is maintained at the network node for the periodic reporting, which does not rely on all the available antenna ports. This also represents savings of uplink resources and energy savings at the network node. Moreover, by the periodic reporting and the aperiodic reporting corresponding to a same CSI process, as opposed to for example, two CSI processes, the network node may also have low feedback overhead.

Further, by the network node indicating the first set of antenna ports and the second set of antenna ports to the wireless device, the wireless device is enabled to configure itself with them, that is, to determine or set the first set of antenna ports and the second set of antenna ports according to the received indications. The periodic reports by the wireless device on the channel between the network node and the wireless device are thereby simplified, since they do not rely on all the available antenna ports. Therefore, low complexity is maintained as well at the wireless device for the periodic reporting. This also represents savings of resources energy savings at the wireless device.

BRIEF DESCRIPTION OF THE DRAWINGS

Examples of embodiments herein are described in more detail with reference to the accompanying drawings, in which.

DETAILED DESCRIPTION

Terminologies

Figure 1:
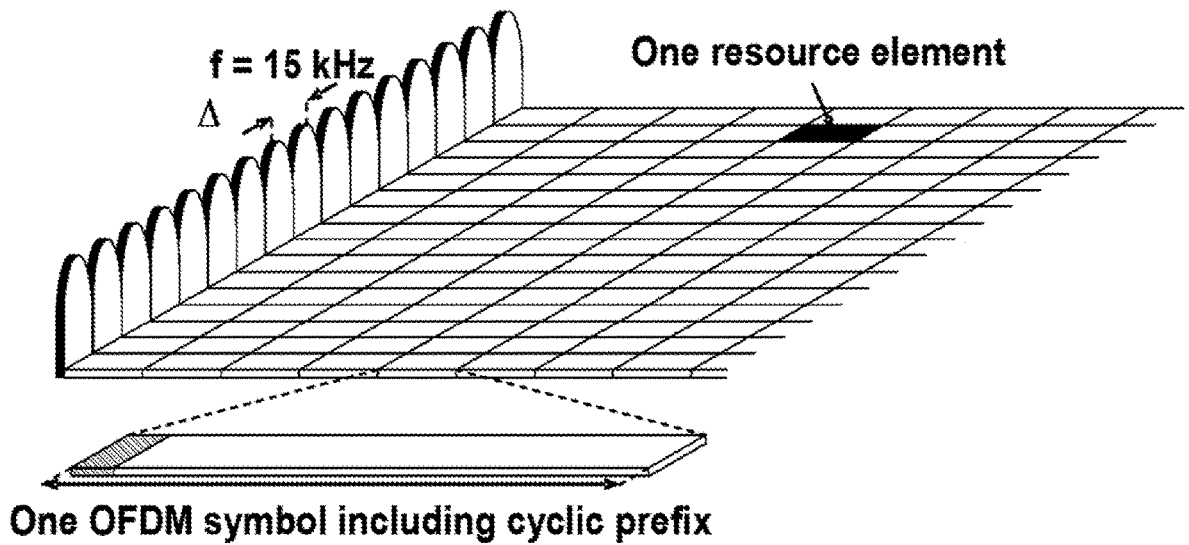
FIG. 1 is a schematic diagram illustrating the LTE downlink physical resource.
Figure 2:
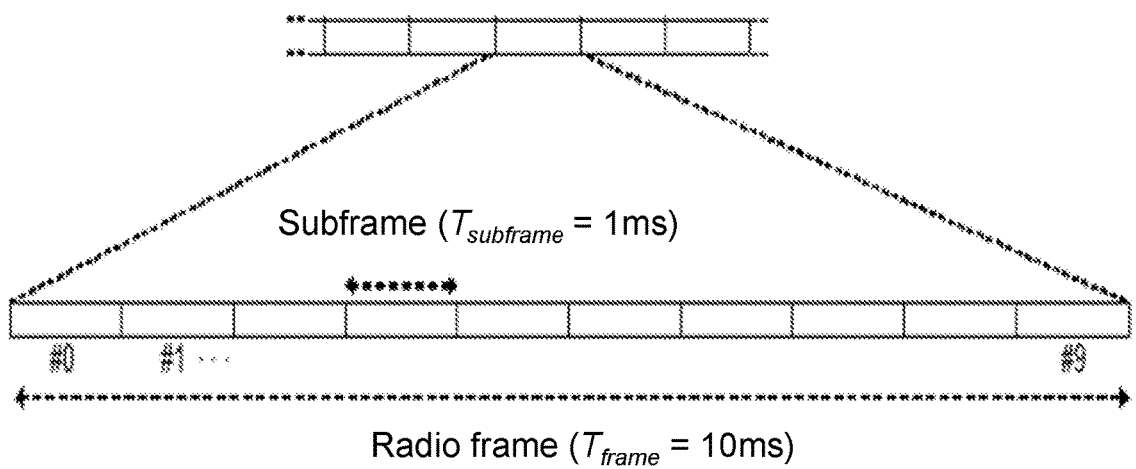
FIG. 2 is a schematic diagram illustrating the LTE time-domain structure.
Figure 3:
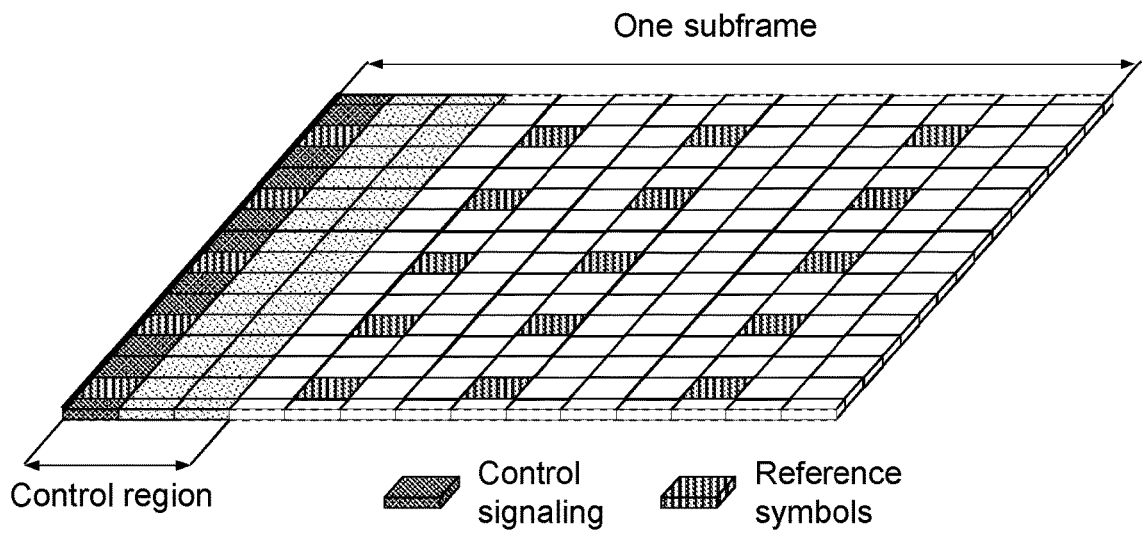
FIG. 3 is a schematic diagram illustrating a DL subframe.
Figure 4:
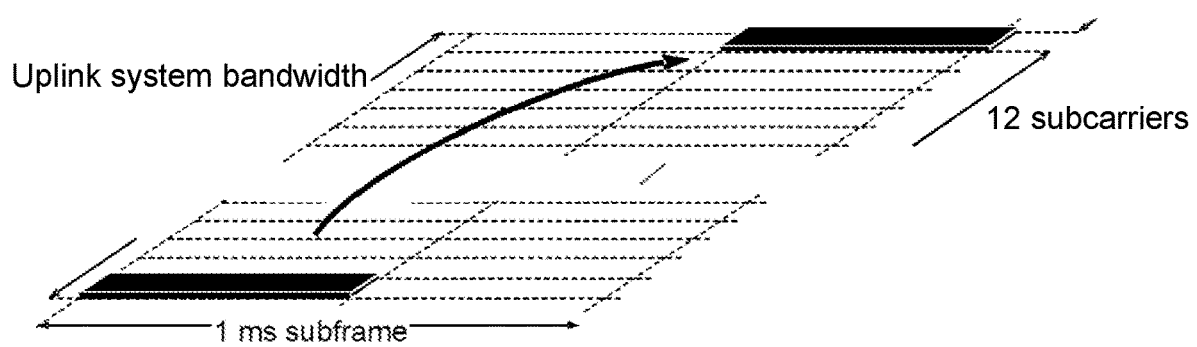
FIG. 4 is a schematic diagram illustrating uplink L1/L2 control signaling transmission on PUCCH.
Figure 5:
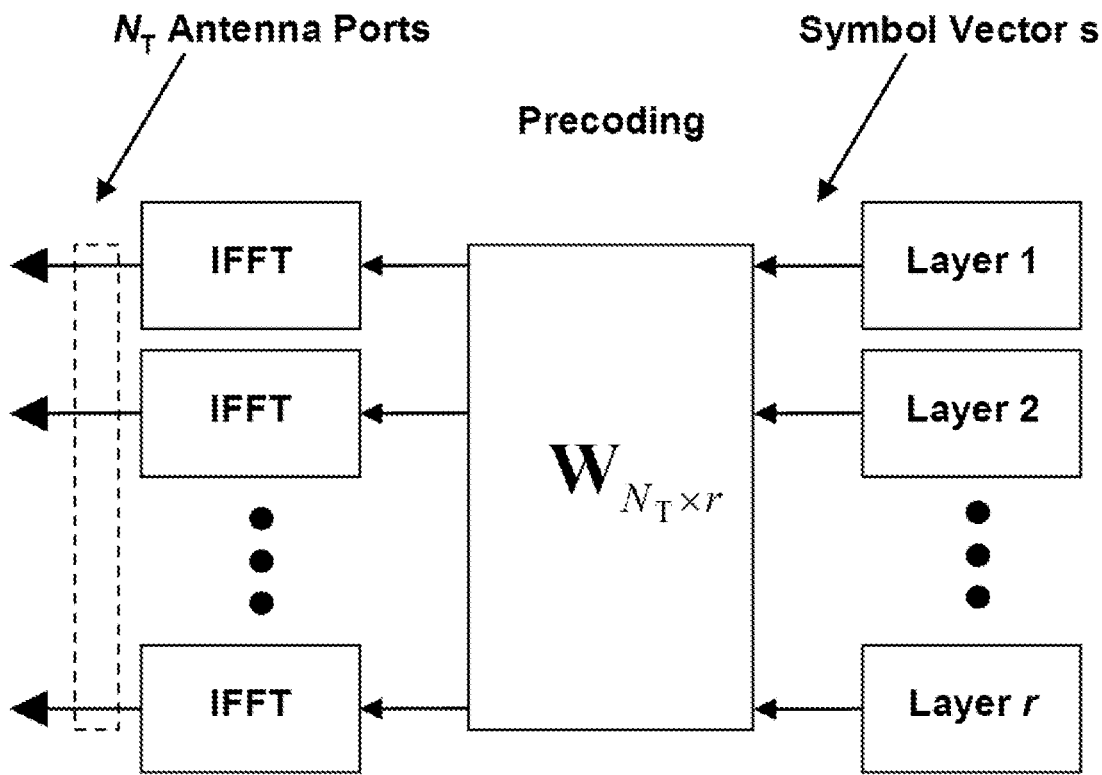
FIG. 5 is a schematic block diagram illustrating transmission structure of precoded spatial multiplexing mode in LTE.
Figure 6:
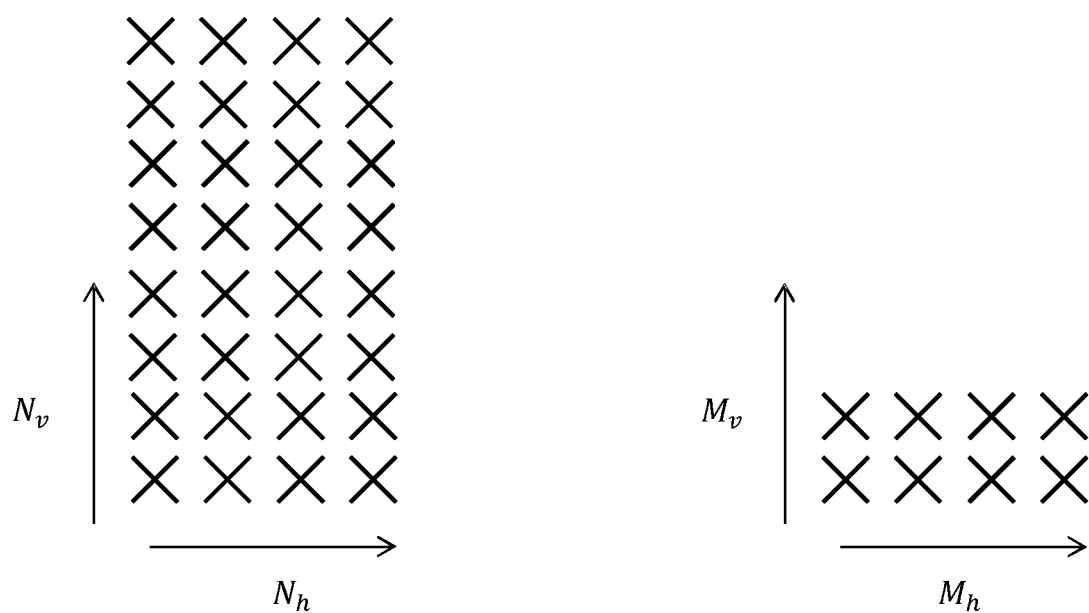
FIG. 6 is a schematic diagram illustrating a two-dimensional antenna array.

The following common terminologies are used in the embodiments and are elaborated below:

Network node: In some embodiments the non-limiting term network node is more commonly used and it refers to any type of network node serving UE and/or connected to other network node or network element or any radio node from where a UE may receive a signal. Examples of network nodes may be radio network nodes such as Node B, base station (BS), Multi-Standard Radio (MSR) radio node such as MSR BS, eNode B, network controller, Radio Network Controller (RNC), base station controller, relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, Personal Digital Assistant (PDA), iPAD, Tablet, mobile terminals, smart phone, Laptop Embedded Equipped (LEE), Laptop Mounted Equipment (LME), USB dongles etc.

Note that although terminology from 3GPP LTE has been used in this disclosure to exemplify the embodiments herein, this should not be seen as limiting the scope of the embodiments herein to only the aforementioned system. Other wireless systems, including 3GPP New Radio (NR), WCDMA, WiMax, UMB and GSM, may also benefit from exploiting the ideas covered within this disclosure.

Also note that terminology such as eNodeB and UE should be considered non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but embodiments herein are equally applicable in the uplink.

As part of the development of the embodiments disclosed herein, a problem associated with existing methods will first be identified and discussed.

Introducing a large number of antennas, e.g., 2D antenna arrays, in existing communication systems poses the following problems. A first problem is energy consumption at the eNB. Even if there is no traffic in the cell, CSI-RS may need to be transmitted from all ports since the UE may be performing measurements on all ports. Since the number of ports may be large, up to 64 ports has been discussed in LTE Rel-13, the 2D antenna array will consume a lot of energy. A second problem is UE energy consumption and complexity, that is, computational complexity, since the complexity increases at least linearly with the number of ports to estimate the channel for. The UE may need to measure all ports periodically, even when it may not receive any data from the eNB. When 2D antenna arrays are deployed, measuring a large number of ports when the UE does not receive data from the eNB will adversely impact UE battery life. Therefore, an additional problem is feedback overhead on the uplink for periodically CSI reporting for the full antenna array.

Embodiments herein address the foregoing problems of the existing methods. In general, embodiments herein may relate to a method for reporting channel information on the uplink, by using measurements on radio signals. Particular embodiments herein may relate to a method for CSI reporting on PUCCH. Further particular embodiments herein may relate to periodic CSI (P-CSI) reports using measurements on fewer, or more generally different or different number of, RS ports than the aperiodic CSI (A-CSI) reports. Different port to (sub)element virtualizations may be used for P-CSI reports than for A-CSI reports. A feature of some particular embodiments herein may be that periodic CSI (P-CSI) reports and aperiodic CSI (A-CSI) reports may not use exactly the same set of RS antenna ports for the CSI measurements. The P-CSI reports may use in general a different number of ports than the A-CSI reports. Typically, the P-CSI reports may use fewer ports than the A-CSI reports.

Herein, CSI-RS may be assumed to be used for measurements to provide CSI reports. However, embodiments herein may not be limited to CSI-RS, but any RS defined for CSI measurements may be used for this purpose.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 7:
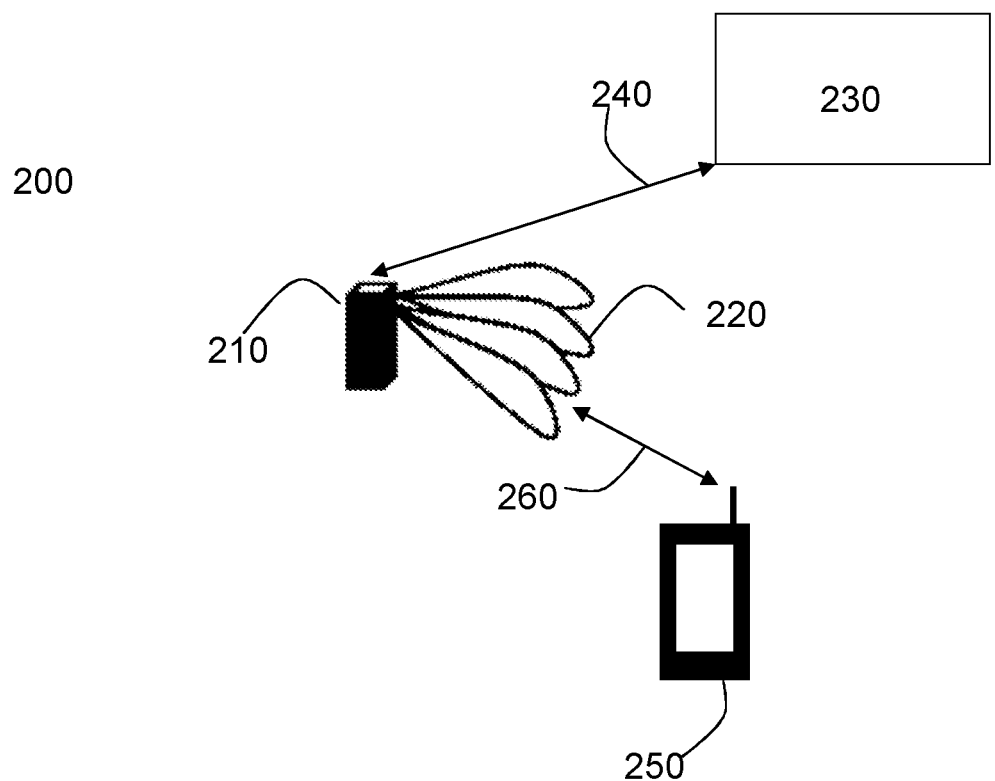
FIG. 7 is a schematic diagram illustrating embodiments of a wireless communications network, according to embodiments herein.

FIG. 7 depicts a wireless communications network 200 in which embodiments herein may be implemented. The wireless communications network 200 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi network, Worldwide Interoperability for Microwave Access (WiMax), 3GPP New Radio (NR) or another 5G system or any cellular network or system. It may also be understood that the wireless communication network 200 may operate in one or more of licensed, license assisted, and unlicensed spectrum.

The wireless communications network 200 comprises a network node 210. The network node 210 may be, for example, a Transmission Point (TP) which transmits beams 220 as illustrated in the non-limiting example of FIG. 7. The network node 210 may alternatively be a base station such as e.g., an eNB, eNodeB, or a Home Node B, a Home eNode B, femto Base Station, BS, pico BS or any other network unit capable to serve a device or a machine type communication device in the wireless communications network 200. In some particular embodiments, the network node 210 may be a stationary relay node or a mobile relay node. The wireless communications network 200 covers a geographical area which may be divided into cell areas, wherein each cell area is served by a network node although, one network node may serve one or several cells, and one cell may be served by more than one network. The network node 210 may be of different classes, such as e.g. macro eNodeB, home eNodeB or pico base station, based on transmission power and thereby also cell size. Typically, the wireless communications network 200 may comprise a number of cells, each served by their respective one or more network nodes. This is not depicted in FIG. 7 for the sake of simplicity.

The network node 210 may support one or several communication technologies, and its name may depend on the technology and terminology used. In 3GPP LTE, the network node 210, which may be referred to as eNodeBs or even eNBs, may be directly connected to one or more networks 230.

The network node 210 may communicate with the one or more networks 230 over a link 240.

A number of wireless devices are located in the wireless communications network 200. In the example scenario of FIG. 7, only one wireless device is shown, wireless device 250. The wireless device 250 is a wireless communication device such as a UE which is also known as e.g. mobile terminal, wireless terminal and/or mobile station. The device is wireless, i.e., it is enabled to communicate wirelessly in the wireless communication network 200, sometimes also referred to as a cellular radio system or cellular network. The communication may be performed e.g., between two devices, between a device and a regular telephone and/or between a device and a server. The communication may be performed e.g., via a RAN and possibly the one or more core networks 230, comprised within the wireless communications network 200. The wireless device 250 may further be referred to as a mobile telephone, cellular telephone, or laptop with wireless capability, just to mention some further examples. The wireless device 250 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a wireless communications system. Further examples of different wireless devices, such as the wireless device 250, that may be served by such a system include, modems, or Machine Type Communication (MTC) devices such as sensors.

The wireless device 250 may communicate with the network node 210 over a radio link 260.

In general, the usage of "first", "second", and/or "third", may be understood to be an arbitrary way to denote different entities, and may be understood to not confer a cumulative or chronological character to the nouns they modify.

Figure 8:
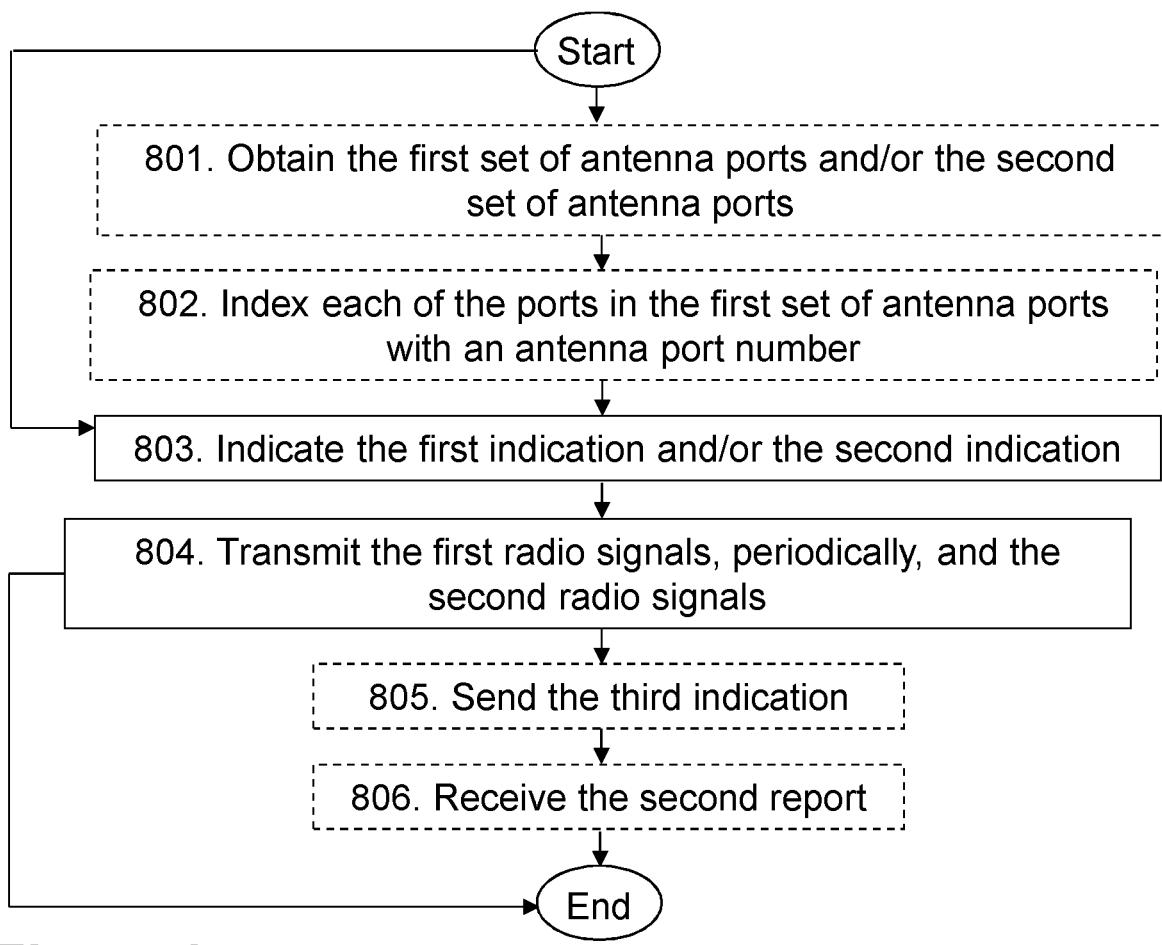
FIG. 8 is a flowchart depicting embodiments of a method in a network node, according to embodiments herein.

Embodiments of a method performed by a network node 210 to indicate to the wireless device 250 a first set of antenna ports and a second set of antenna ports, will now be described with reference to the flowchart depicted depicted in FIG. 8. The network node 210 and the wireless device 250 operate in wireless communications network 200.

The method may comprise one or more of the following actions. In some embodiments all the actions may be performed. In some embodiments, one or more actions may be performed. One or more embodiments may be combined, where applicable. All possible combinations are not described to simplify the description. In FIG. 8a, optional actions are indicated with dashed lines.

Action 801

In the course of communications between the network node 210 and the wireless device 250, via e.g., the radio link 260, the network node 210 may need to change transmission parameters based on the conditions of the radio channel between them. In order to support that, the wireless device 250 may send reports on the state of the radio channel used for communications with the network node 210. These reports, which may be CSI reports, may be sent periodically, and aperiodically, as described earlier in this disclosure. Since the reports involve energy consumption as well as usage of radio resources, embodiments herein provide for a method that may enable the reduction of the energy consumption by the network node 210, and the wireless device 250, as well as the saving of radio resource usage, by providing that periodic CSI (P-CSI) reports and aperiodic CSI (A-CSI) reports may not use exactly the same set of RS antenna ports for the CSI measurements. In order to enable this, in this Action, the network node 210 may obtain at least one of: a) a first set of antenna ports, M', for first measurements by the wireless device 250 on first radio signals, the first measurements being associated with periodic reporting by the wireless device 250, and b) a second set of antenna ports, M, for second measurements by the wireless device 250 on second radio signals, the second measurements being associated with aperiodic reporting by the wireless device 250.

The periodic reporting and the aperiodic reporting correspond to a same Channel State Information (CSI) process.

"Antenna ports for" may be understood as referring to antennas being defined for, e.g., by a standard specification. That is, to indicate a set of antenna ports for may be understood as indicating a set of antenna ports to be used for, or configured for.

The radio signals may be Reference Signals (RS). That is, any of the first radio signals and the second radio signals may be reference signals, such as CSI-RS. The reference signals may be transmitted by the network node 210 as described in Action 204.

"Associated with" may be understood as referring to being defined for, e.g., by a standard specification.

In some embodiments, the reporting comprises reporting of CSI, and the antenna ports are CSI-RS ports. However, one of skill in the art may understand the embodiments herein are equally applicable to functionally similar reports and antenna ports, although the terminology may be different.

Obtaining may be understood herein as any of, e.g., determining, calculating, selecting, identifying, or receiving from another node in the wireless communication network 200, e.g., a node in the one or more core networks 230, at least one of: a first indication of the first set M' of antenna ports and a second indication of the second set M of antenna ports.

The first set of antenna ports is different than the second set of antenna ports. The first set of antenna ports being different than the second set of antenna ports may be understood as referring to that at least one port in the second set of antenna ports is not the same as in the first set of antenna ports.

How the first set of antenna ports may differ from the second set of antenna ports will be discussed in detail later, but as an overview, the first set of antenna ports may be different than the second set of antenna ports in that at least one of the following: a) the first set of antenna ports has a first virtualization and the second set of antenna ports has a second virtualization, further details are provided for this option below in the "Example group 1"; b) the first set of antenna ports may comprise fewer antenna ports than the second set of antenna ports, further details are provided for this option below in the "Example group 2"; c) the first set of antenna ports is a subset of the second set of antenna ports, further details are provided below for this option in the "Example group 3", d) the first set of antenna ports are obtained by precoding of the second set of antenna ports in a vertical dimension or a horizontal dimension, further details are provided for this option below in the "Example group 4", e) the first set of antenna ports are obtained by decimating of the second set of antenna ports in either a vertical dimension, a horizontal dimension, or both dimensions, further details are provided for this option below in the "Example group 3", and f) the first set of antenna ports comprises an aggregation of multiple subsets of the second set of antenna ports, further details are provided for this option below in the "Example group 3".

In some embodiments, the second set of antenna ports may comprise at least one of: a number of vertical antenna ports, and a number of horizontal antenna ports.

Action 802

In some embodiments, the network node 210 may need to indicate to the wireless device 250 an indication for the wireless device 250 to send a first report corresponding to the first measurements on the first radio signals according to a periodic reporting type. For the second report, there may be existing indications or configurations that may be available to the wireless device 250. A reporting type, may be understood as a reporting fashion, or manner. The network node 210 may need to further indicate to the wireless device 250 to send the first report using a precoding codebook. The codebook may assume a certain antenna port indexing. Hence, in such embodiments, the network node 210 may, in this Action, index each of the ports in the first set of antenna ports with an antenna port number. The antenna port numbers, which may result from the indexing action, may correspond to antenna ports used in a precoding codebook. The indexing may be performed, e.g., by assigning one of the antenna port numbers, an identifier, to each one of the antenna ports. This action may be performed, for example, when the first set of antenna ports is a subset of the second set of antenna ports, by indexing a subset of ports out of a larger set of ports and using a codebook that matches the smaller set of ports.

Action 803

In this Action, the network node 210 indicates to the wireless device 250 at least one of: a) a first indication of a first set, e.g., M', of antenna ports for first measurements by the wireless device 250 on the first radio signals, the first measurements being associated with periodic reporting by the wireless device 250, and b) a second indication of a second set, e.g., M, of antenna ports for second measurements by the wireless device 250 on the second radio signals, the second measurements being associated with aperiodic reporting by the wireless device 250. As stated earlier, the first set of antenna ports is different than the second set of antenna ports. Also, the periodic reporting and the aperiodic reporting correspond to a same Channel State Information (CSI) process.

The indicating 203 may be understood herein as sending, e.g., via the radio link 260, at least one of the first indication and the second indication to the wireless device 250. Sending the at least one of the first indication and the second indication may comprise sending one or more messages comprising one or more instructions to configure the wireless device 250 with the at least one of: the first set of antenna ports, and the second set of antenna ports. Indicating may also be understood as referring to configuring the wireless device 250 with the at least one of: the first set of antenna ports, and the second set of antenna ports. In some particular embodiments the indicating 203 may comprise an instruction to use any of a) the first set of antenna ports for the first measurements for periodic reporting, and b) the second set of antenna ports for second measurements for aperiodic reporting. In some embodiments, the indicating 203 may be performed through Radio Resource Control, RRC, signalling or through MAC control elements.

In some embodiments, the indicating 203 may comprise only the first indication, and the first set of antenna ports may be further used for the second measurements by the wireless device 250 on the second radio signals, the second measurements being associated with aperiodic reporting by the wireless device 250. That is, the network node 210 may only indicate the first indication, and the wireless device 250 may then itself derive or calculate the second set of antenna ports. As one of skill in the art may understand, the converse also may apply. In sum, only one indication may be sent, and the other indication may be derived from the sent indication.

Any of the first indication and the second indication may be, for example, a reference to an antenna port number, such as those indexed in Action 802, or e.g., identifiers of CSI-RS resources.

In some embodiments, the first indication is of the obtained first set of antenna ports, and the second indication is of the obtained second set of antenna ports, as obtained, respectively in Action 801.

In some embodiments, the indicating may be based on a capability of the wireless device 250. The capability of the wireless device 250 may be related to a capability to support multiple input multiple output communication, e.g., Rel.13 capability to support FD-MIMO. In some embodiments, the capability of the wireless device 250 may be related to a capability of supported number of CSI-RS antenna ports, e.g., Rel.13 capability to support FD-MIMO with more than 8 CSI-RS ports in a CSI process. In some embodiments, the capability may be related to a supported number of antenna ports in a CSI process.

In some embodiments, a first set of time-frequency resources may be assigned to the first set of antenna ports and a second set of time-frequency resources may be assigned to the second set of antenna ports, and one of following situations may apply: a) the first set of time-frequency resources may comprise an aggregation of multiple subsets of the second set of time-frequency resources; b) the first set of time-frequency resources may be a subset of the second set of time-frequency resources; c) the first set of time-frequency resources may be different from the second set of time-frequency resources; and d) the first set of time-frequency resources may be comprised in a first time-resource unit, e.g. a first subframe, and the second set of time-frequency resources is comprised in a second time-resource unit, e.g., a second subframe.

Action 804

In this Action, the network node 210 transmits, to the wireless device 250, the first radio signals, periodically, over the first set of antenna ports and the second radio signals over the second set of antenna ports. Transmission may be performed, e.g., via the radio link 260.

The transmitting of the first radio signals may be performed over the obtained first set of antenna ports and the transmitting of the second radio signals may be performed over the obtained second set of antenna ports, as obtained, respectively in Action 801.

Action 805

In some examples, the network node 210 may receive, from the wireless device 250 a first report corresponding to the first measurements on the first radio signals transmitted over the first set of antenna ports, the first report being received according to a periodic reporting type. As mentioned earlier, the aperiodic reports may be triggered by a the network node 210. Accordingly, in this Action, the network node 210 may send a third indication to the wireless device 250 e.g., in a DCI message. The third indication may trigger the wireless device 250 to send a second report corresponding to the second measurements on the second radio signals, the second report being sent, that is, triggered to be sent, according to the aperiodic reporting, which may also be referred to as an aperiodic reporting type.

In some embodiments, the indicating in Action 803 may further comprise a fourth indication for the wireless device 250 to send the first report corresponding to the first measurements on the first radio signals according to the periodic reporting, and to send the first report using the precoding codebook referred to in Action 802.

Action 806

In this Action, the network node 210 may receive the second report from the wireless device 250, e.g., via the radio link 260. This may happen in response to Action 805.

Figure 9:
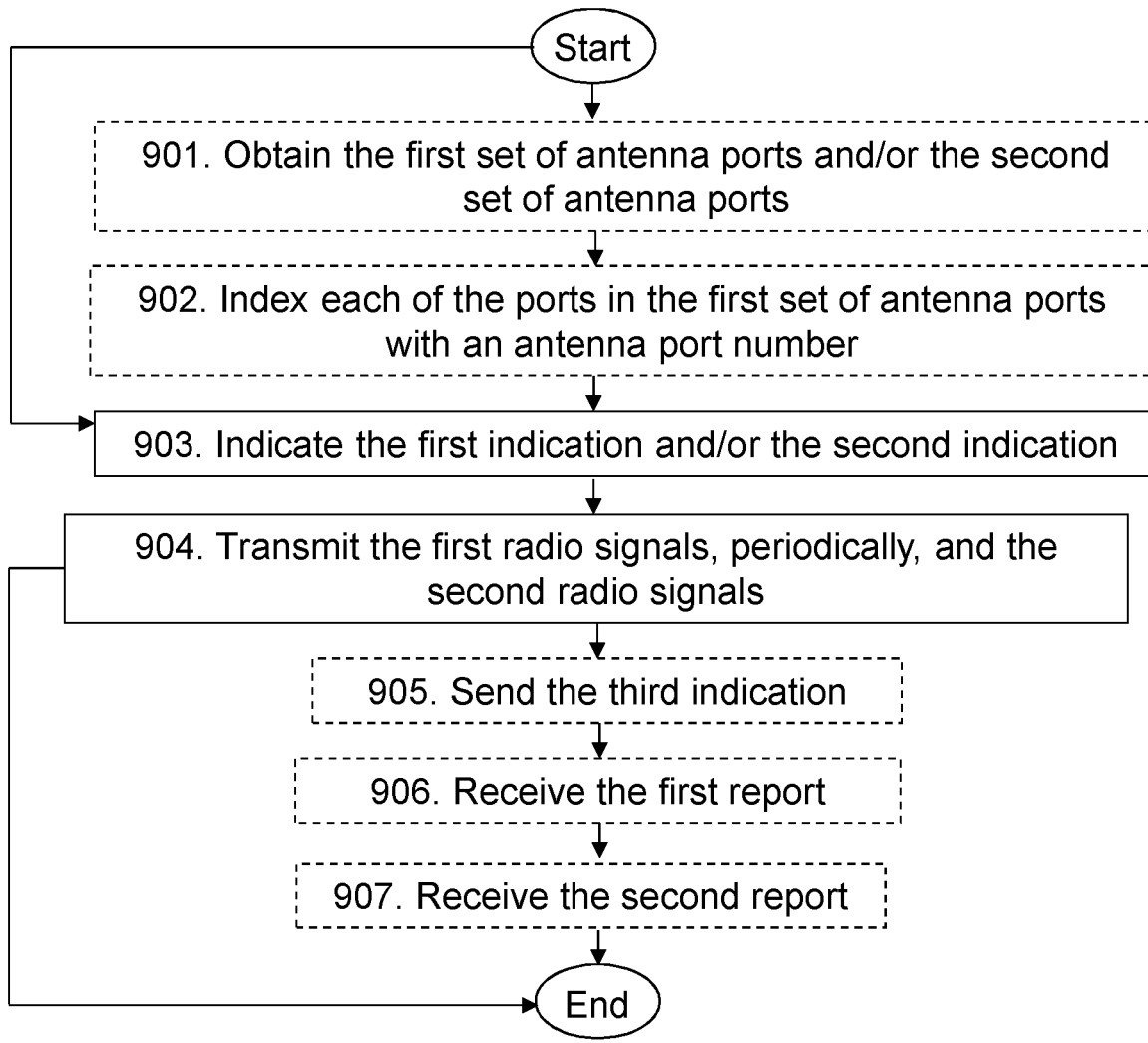
FIG. 9 is a flowchart depicting embodiments of a method in a network node, according to embodiments herein.

FIG. 9 is a schematic flowchart of another example of the method performed by the network node 210 to indicate to the wireless device 250 the first set of antenna ports and the second set of antenna ports. In the example of FIG. 9, Actions 901-905 correspond to Actions 801-805 of FIG. 8, and Action 907 corresponds to Action 806 of FIG. 8, therefore, this actions will not be described again in reference to this Figure. As in FIG. 8, in FIG. 9, optional actions are indicated with dashed lines. In FIG. 9, Action 906 indicates how in some examples the network node 210 may receive, the first report from the wireless device 250. The first report may correspond to the first measurements on the first radio signals transmitted over the first set of antenna ports, and it may be received according to the periodic reporting type.

Figure 10:
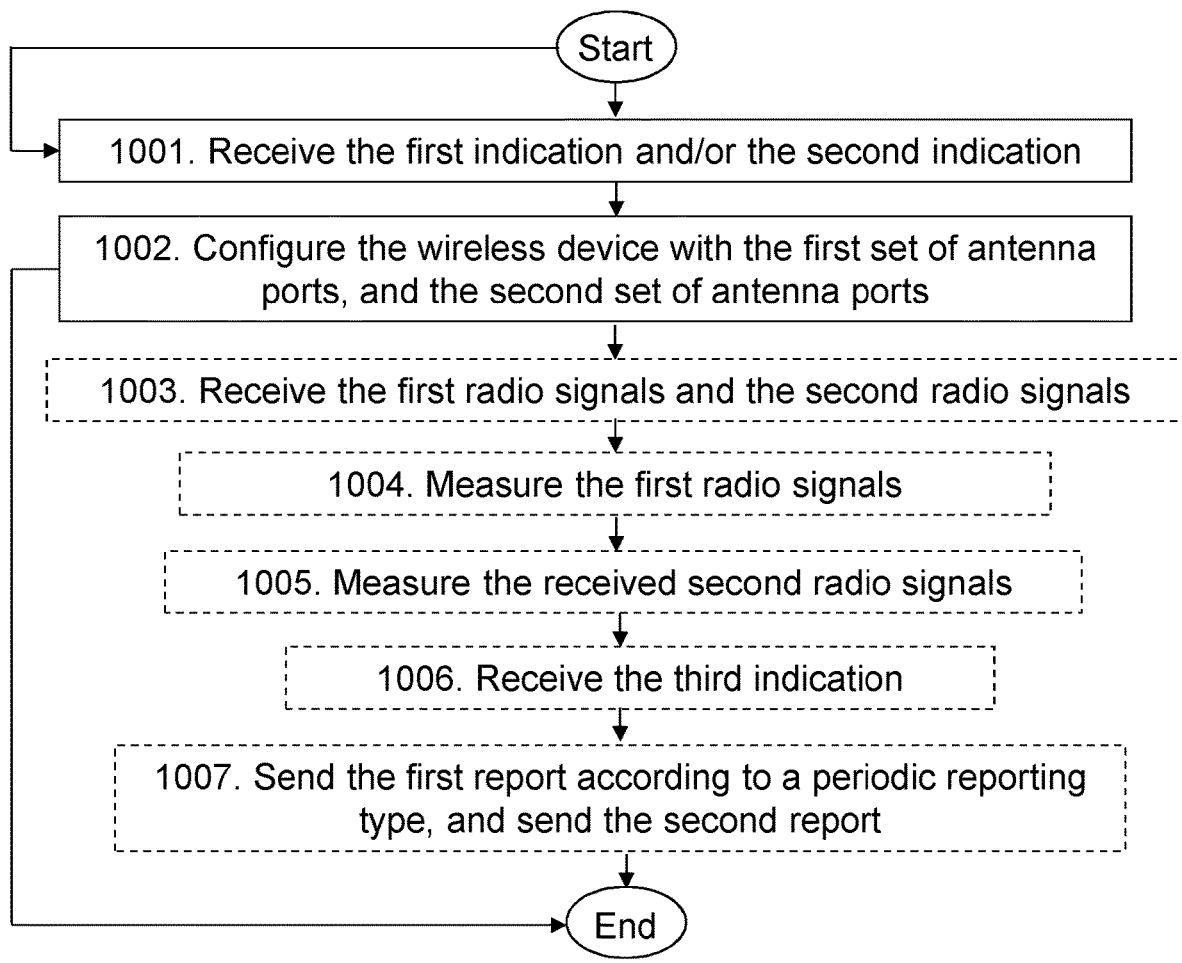
FIG. 10 is a flowchart illustrating embodiments of a method in a wireless device, according to embodiments herein.

Embodiments of a method performed by a wireless device 250 to configure the wireless device 250 with the first set of antenna ports, and the second set of antenna ports, will now be described with reference to the flowchart depicted depicted in FIG. 10. The wireless device 250 operates in a wireless communications network, e.g., the wireless communications network 200.

The method may comprise one or more of the following actions. In some embodiments all the actions may be performed. In some embodiments, one or more actions may be performed. One or more embodiments may be combined, where applicable. All possible combinations are not described to simplify the description. In FIG. 10, optional actions are indicated with dashed lines.

The detailed description of some of the following corresponds to the same references provided above, in relation to the actions described for the network node 210, and will thus not be repeated here.

Action 1001

As a consequence of the network node 210 indicating the first indication and the second indication to the wireless device 250, in this Action, the wireless device 250 receives from the network node 210, at least one of: a) the first indication of the first set, e.g., M', of antenna ports for the first measurements by the wireless device 250 on the first radio signals, the first measurements being associated with the periodic reporting by the wireless device 250, b) the second indication of the second set, e.g., M, of antenna ports for the second measurements by the wireless device 250 on the second radio signals, the second measurements being associated with the aperiodic reporting by the wireless device 250. As stated earlier, the first set of antenna ports is different than the second set of antenna ports. The periodic reporting and the aperiodic reporting correspond to a same CSI process.

In some embodiments, the receiving in this Action may be performed through RRC signalling or via MAC signalling.

In some embodiments, the receiving in this Action may be of only the first indication, and the first set of antenna ports may be further used for the second measurements by the wireless device 250 on the second radio signals, the second measurements being associated with the aperiodic reporting by the wireless device 250.

As described earlier, the reporting may comprise reporting of CSI, wherein the radio signals are RS. The receiving in this Action 1001 may be based on the capability of the wireless device 250, wherein the capability may be related to a supported number of antenna ports in a CSI process.

Also in the same way as it was described in relation to FIG. 8, the first set of antenna ports may be different than the second set of antenna ports in that at least one of the following may apply: a) the first set of antenna ports has a first virtualization and the second set of antenna ports has a second virtualization, further details are provided for this option below in the "Example group 1"; b) the first set of antenna ports may comprise fewer antenna ports than the second set of antenna ports, further details are provided for this option below in the "Example group 2"; c) the first set of antenna ports is a subset of the second set of antenna ports, further details are provided below for this option in the "Example group 3", d) the first set of antenna ports are obtained by precoding of the second set of antenna ports in a vertical dimension or a horizontal dimension, further details are provided for this option below in the "Example group 4", e) the first set of antenna ports are obtained by decimating of the second set of antenna ports in either a vertical dimension, a horizontal dimension, or both dimensions, further details are provided for this option below in the "Example group 3", and f) the first set of antenna ports comprises an aggregation of multiple subsets of the second set of antenna ports, further details are provided for this option below in the "Example group 3".

In some embodiments, the second set of antenna ports may comprise at least one of: a number of vertical antenna ports, and a number of horizontal antenna ports.

In some embodiments, the receiving in this Action 1001 may further comprise receiving the fourth indication for the wireless device 250 to send the first report. That is. The fourth indication may indicate to the wireless device 250 to send the first report corresponding to the first measurements on the first radio signals according to the periodic reporting, and to send the first report using a precoding codebook in particular.

Action 1002

This Action, the wireless device 250 configures itself, the wireless device 250, with the first set of antenna ports, and the second set of antenna ports, according to the received at least one of: the first indication and the second indication. Configuring here may be understood as determining, deriving, setting, applying, etc . . . , the first set of antenna ports and the second set of antenna ports, e.g., so that the first measurements may be performed according to the first set of antenna ports, and the second measurements may be performed according to the second set of antenna ports.

Action 1003

In this Action, the wireless device 250 may receive, from the network node 210, the first radio signals, e.g., CSI-RS, over the first set of antenna ports and the second radio signals over the second set of antenna ports, e.g., via the radio link 260. The receiving of the first radio signals may be periodic.

Action 1004

In this Action, the wireless device 250 may measure 1004 the received first radio signals according to the first set of antenna ports. The measuring in this Action of the received first radio signals may comprise estimating information, e.g., CSI, about the radio channel between the wireless device 250 and the network node 210. The actual measurements may be otherwise performed according to known methods.

Action 1005

In this Action, the wireless device 250 may measure the received second radio signals. The measuring the received second radio signals may be performed according to the second set of antenna ports. The measuring of the received second radio signals may comprise estimating information, e.g., CSI, about the radio channel between the wireless device 250 and the network node 210, based on a downlink codebook for an extended set of antenna ports, e.g., supporting a number of antenna ports greater than 8. The downlink codebook for the extended set of antenna ports may be, e.g., a 2 Dimensional downlink codebook, or e.g., a 1D codebook with 12 ports. The actual measurements may otherwise be performed according to known methods.

Action 1006

In this Action, the wireless device 250 may receive the third indication from the network node 210, e.g., in a DCI message. The third indication may trigger the wireless device 250 to send the second report to the network node 210.

Action 1007

In this Action, the wireless device 250 may send, to the network node 210, a) the first report corresponding to the first measurements on the first radio signals received over the first set of antenna ports, the first report being sent according to the periodic reporting, which may also be known as the periodic reporting type, and b) the second report, corresponding to the second measurements on the second radio signals received over the second set of antenna ports, the second report being sent according to the aperiodic reporting, which may also be known as the aperiodic reporting type. The sending may be implemented, e.g., via the radio link 260.

As mentioned earlier, the reporting may comprise reporting of CSI, and the antenna ports may be CSI-RS, ports.

Also as mentioned earlier, in some embodiments, the sending of the second report corresponding to the second measurements on the second radio signals may be triggered by the received third indication received in Action 1006, the second report being sent according to the aperiodic reporting.

Examples and further details of embodiments herein are described below in different groups of examples, with CSI-RS as an illustrative example of the antenna ports. The first set of antenna ports may be referred to as M' P-CSI-RS ports or simply P-CSI ports. The second set of antenna ports may be referred to as M A-CSI-RS ports or simply A-CSI ports. In the description herein, a UE is used as an example of the wireless device 250 and an eNB is used as an example of the network node 210. Hence, any reference herein to a "UE" may be understood to refer to the wireless device 250, and any reference herein to an eNB may be understood to refer to the network node 210.

Example Group 1

The M' P-CSI-RS ports may be virtualized to the antenna (sub)elements in a different manner from the M A-CSI-RS ports. Hence, the sub-array definitions may be different for P-CSI and A-CSI. The port to element virtualization may allow the beamwidth and beam direction of individual ports to be controlled. Since a port may be distributed onto more than one element, potentially more power may be transmitted from that port. This is good for coverage.

The beam pointing direction may also be tailored to match the coarseness of the P-CSI reporting. P-CSI reporting may often be coarse since the number of CSI feedback bits may be extremely limited, and the P-CSI reporting periodicity may be long. Hence, it may be observed that since the P-CSI feedback may limit the amount of information that may be conveyed, it may be advisable that a UE selection among precise pointing beams be avoided in P-CSI feedback. This precise channel feedback may instead be reported in A-CSI, where a much larger information payload may be conveyed. Thus, the virtualizations and use of the physical antenna elements that may be used for P-CSI and A-CSI ports may be matching the information conveying capabilities of the feedback channels.

Mapping a single port to a single antenna element, the UE may measure all M ports and use a high resolution M-port codebook, which has precise pointing beams, with many possible beam directions, that may correspond to where most of the users in the cell tend to be, and thus suitable for A-CSI. For P-CSI, fewer M'<M ports may be used, and when the number of ports available for the CSI feedback codebook is smaller, the codebook for CSI feedback may be coarser and may have fewer possible beam directions, hence, this may generate a coarse and less precise beam for the CSI feedback, suitable for P-CSI. P-CSI and A-CSI may use different subarrays.

Example Group 2

If a 2D port layout has M ports, then a first CSI-RS port resource of M ports may be used for A-CSI, and an additional M' CSI-RS port resource may be configured in the CSI process, used for P-CSI. If there is no traffic in the cell, only P-CSI feedback may be needed from the served UEs, and the transmitter corresponding to the M ports may be powered down, to save energy and to reduce interference, which is a benefit of the embodiments herein.

Moreover, in one example, the UE may perform measurements on P-CSI periodically, on the periodically present CSI-RS resource of M' ports. In some examples, the UE may only perform measurements on the M CSI-RS ports associated with A-CSI, if UE is triggered by the eNB, e.g., in a DCI message.

As one particular example, M=12 ports may be configured by the eNB to the UE of a new release, used for A-CSI reporting, and M'=4 ports may be configured for P-CSI reporting. The legacy UEs, which may only support 2, 4 or maximally 8 antenna ports, e.g. 2, 4 or 8 port CSI-RS, may be configured by eNB to use M'=4 CSI-RS ports for both their P-CSI and A-CSI reporting. Hence, the P-CSI reporting for new and legacy UE may be configured to use the same set of CSI-RS ports, e.g. a 1D port layout of 2, 4 or 8 ports.

Example Group 3

In this example group, the M' ports that may be configured to be used for P-CSI may be a subset of the total M ports of the port layout that may be configured by eNB to be used for A-CSI. There may be different ways to determine the subset of ports for periodic reporting, and some non-limiting example ways are provided in this example group. Note that the port layout may be 1D or 2D in the sense that the higher layer configured codebook that may be used for A-CSI reporting of the M ports may be constructed for a 1D or 2D port layout. This configuration may be done by higher layer signaling of the parameters $M_v$ and $M_h$.

In this case, in one example, a single CSI-RS resource of M ports may be configured by the eNB to the UE of a new release for A-CSI reporting. Then, which M' out of the M configured ports the P-CSI may use, may be given by standard specification or signaled to the UE. This signaling may use higher layer signaling, or dynamic signaling, e.g., in Physical Downlink Control CHannel (PDCCH)/Enhanced Physical Downlink Control Channel (EPDCCH), if greater flexibility in dynamic port selection for P-CSI may be needed.

Figure 11:
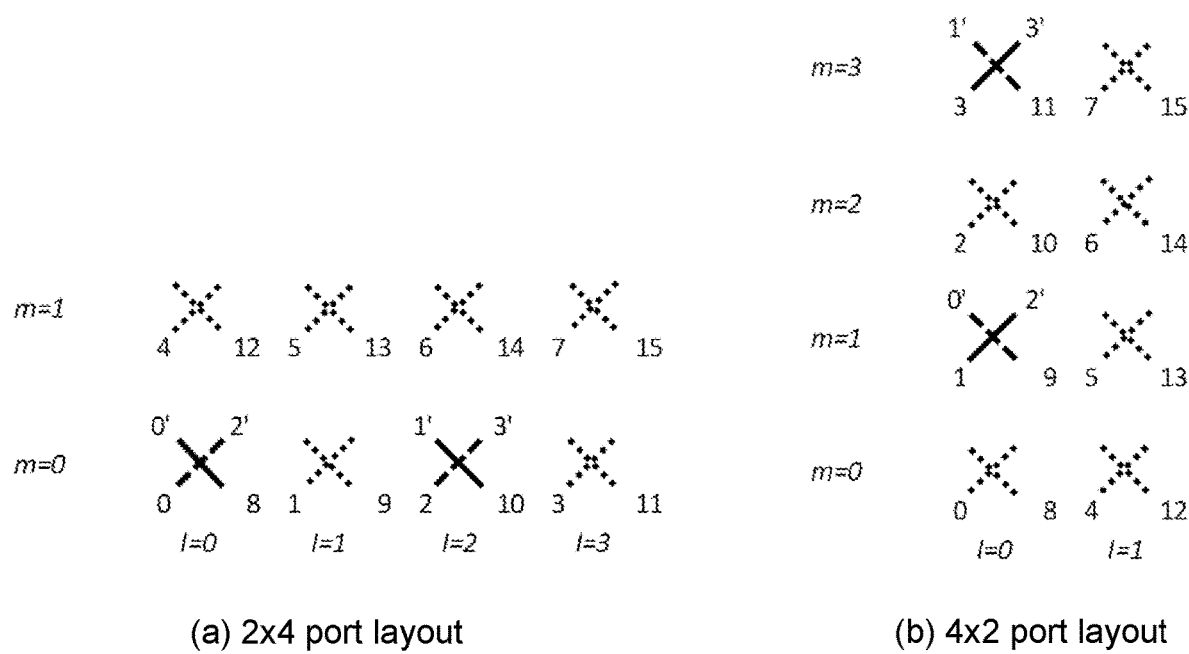
FIG. 11 is a schematic diagram illustrating CSI-RS ports for P-CSI reporting with a (a) 2×4 and (b) 4×2 port layout, according to embodiments herein.

Examples where M'=4 ports that may be used for P-CSI reporting are assigned to a general subset of the M ports in the 2D port layout are shown in FIG. 11. FIG. 11 is a schematic diagram illustrating CSI-RS ports for P-CSI reporting with a (a) 2×4 and (b) 4×2 port layout. In each of the representations in (a) and (b), a port layout with dual polarized elements is shown, where the +45° and −45° polarizations are indicated with black dashed and solid lines, respectively. Dashed port positions are used only for A-CSI, but not for P-CSI. One port numbering approach for when the M' ports are a subset of the M A-CSI CSI-RS ports is illustrated, where the A-CSI ports are numbered from 0 to 15, while the ports used for P-CSI are additionally numbered with 0' to 3'. Alternatively, the P-CSI and A-CSI ports may be identified with a two dimensional index (m, l), as shown in the Figure.

In one example, the eNB may configure the UE with M ports, which may be numbered as port 15, 16, 17, . . . , 15+M−1 and then, in addition, the eNB may signal to the UE a list of the ports that may be used for the M' ports associated with P-CSI reporting. In the example in FIG. 11, to the left, below, these P-CSI ports {0', 1', 2', 3'} may then correspond to A-CSI ports {8, 10, 0, 2} respectively. Hence, in this example, the list {8, 10, 0, 2} is signaled to the UE from the eNB by higher layers, such as RRC.

Decimation of antenna ports may be understood as selecting a subset of antenna ports uniformly, e.g. one out of every N ports. Since the ports used for P-CSI may be decimated by, for example, a factor of two, or four, along either the vertical or horizontal axis from those used for A-CSI, the vertical or horizontal antenna pattern may likely have two, four, main lobes with similar magnitude, but separated in azimuth or elevation, leading to ambiguity in CSI reporting. For example, after decimation, the selected antenna ports may be separated by more than half wavelength apart, which may result in so called grating lobes, that is, in more than one peak in the antenna pattern. As a result, multiple precoders may be equally good for a UE. This ambiguity may be resolved if needed by configuring the UE to select only PMIs corresponding to half of the beam directions that contain only one of the main lobes, possibly using LTE codebook subset restriction mechanisms, or the eNB may use other information such as prior A-CSI feedback from the full set of M ports, or uplink measurements. By resolving this ambiguity, the precoding for all 4 ports along the horizontal or vertical axis may be determined, allowing a 4 port CSI feedback to provide similar CSI to a 8 port feedback. Since a primary purpose of P-CSI feedback may be to select UEs to schedule by determining their relative channel quality, it may not be relevant to have highly accurate precoding information from the full M ports. Furthermore, if the copolarized elements are sufficiently correlated, the difference in array gain between the P-CSI from a decimated array and the A-CSI from a full array may be determined and used to correct the SINR estimate in the eNB derived from the P-CSI to match what may be received using the A-CSI.

Therefore, in an example with cross polarized antenna elements, all combinations of M'/2 port pairs used for P-CSI may be selected from the M/2 ports used for A-CSI. The selection may be such, that the closest pair of antenna ports of the M' antenna ports selected from the M port 2D layout may correspond to non-consecutive antenna elements. The correspondence to non-consecutive antenna elements may be identified as the M' ports having a difference in port numbers that is greater than 1 when the port numbers correspond to a row or column of a 2D array and are listed in monotonically increasing order, and when copolarized ports may be consecutively numbered. Alternatively, the correspondence to non-consecutive antenna elements may be identified as the M' ports having a minimum phase shift among codebook entries corresponding to pairs of copolarized ports that may be larger than the minimum phase shift between any pair of copolarized ports in the codebook.

In an example allowing non-consecutive P-CSI CSI-RS ports, separate CSI-RS resources of M and M' ports each may be configured for the A-CSI and P-CSI CSI-RS ports. In this case, it may be desirable for the P-CSI CSI-RS resources of at least some antenna ports to be configured to the identical ports to those used by some of the A-CSI CSI-RS antenna ports. This reuse of resources may avoid the need to transmit redundant CSI-RS resources for the P-CSI CSI-RS ports, thereby saving overhead and reducing interference to other cells or transmission points. In order to allow the P-CSI to correspond to any of the A-CSI CSI-RS ports, the resources for the P-CSI CSI-RS ports may be assigned in small groups of ports. Therefore, in one example, the P-CSI CSI-RS ports may be assigned a list δ of CSI-RS resources, where all resources in the list have assigned a common CSI reference signal subframe configuration, and each resource in the list may be identified with a different CSI reference signal configuration, and each resource in the list may correspond to a subset of the ports used for P-CSI. The CSI reference signal configuration may identify the resource elements and OFDM symbols carrying the CSI-RS, as well as the sequence used to spread the CSI-RS. The CSI reference signal subframe configuration may identify the subframes in which the CSI-RS ports are present. Having a single subframe configuration may mean that the P-CSI CSI-RS ports are transmitted together in the same subframes.

Figure 12:
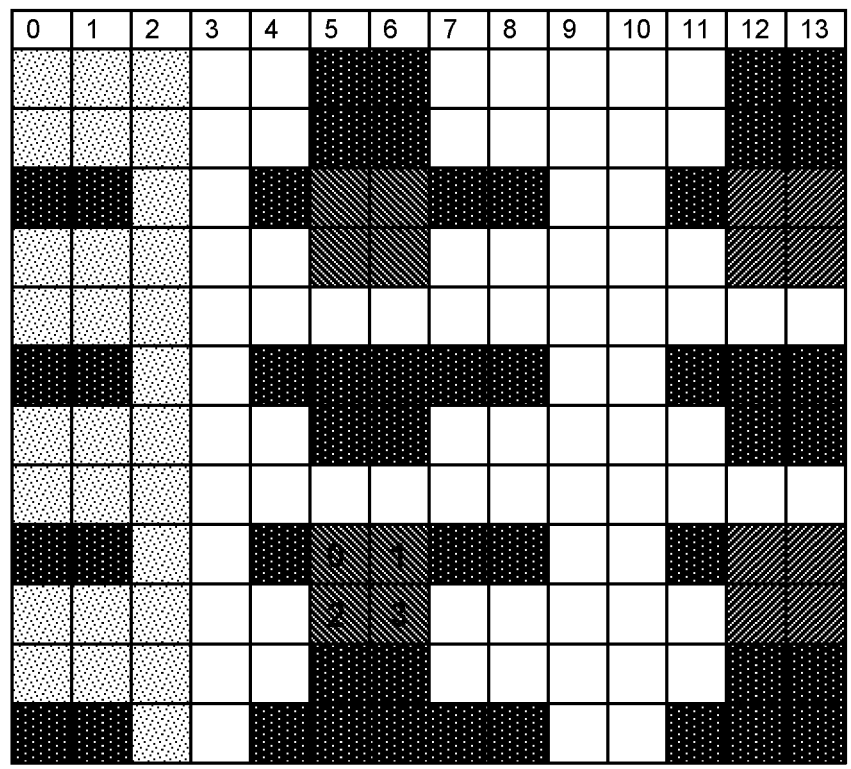
FIG. 12 is a schematic diagram illustrating P-CSI RS port mapping to time-frequency resources, according to embodiments herein.
Figure 12:
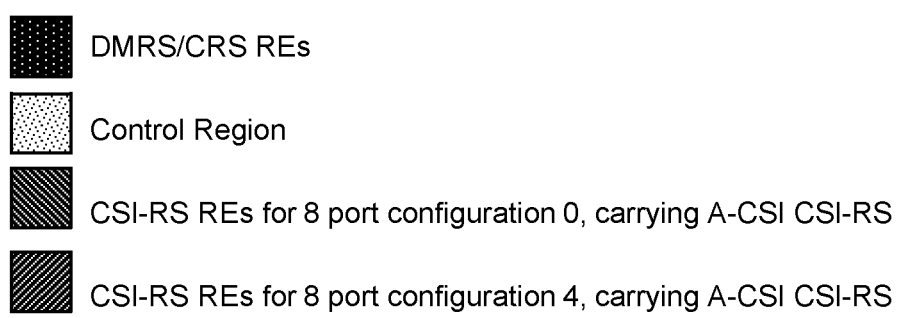

In an example where the CSI-RS resources for P-CSI are allocated separately from the A-CSI resources for the 4×2 port layout pictured in FIG. 11(b) and where Rel-12 CSI-RS resource definitions from 36.211 section 6.10.5 are used, the P-CSI CSI-RS resources may be indicated with a list $\wp = \{5, 11\}$ of CSI reference signal configurations for 1 or 2 ports, a CSI reference signal subframe configuration=1, indicating that the P-CSI CSI-RS resources arrive with a 5 ms period, and are transmitted in the second subframe of the 5 ms period. In this example, P-CSI CSI-RS port numbers are assigned in pairs and consecutively from the beginning of the list δ. A non-limiting example of the P-CSI RS port number mapping to a subframe is shown in the schematic diagram of FIG. 12 along with the REs occupied by a A-CSI CSI-RS. In FIG. 12, the columns indicate the 14 symbols of the subframe, numbered from 0 to 13 at the top, while the rows indicate each of the subcarriers. The numbers in bold in the 5$^{th}$ and 6$^{th}$ columns indicate the 4 ports used for P-CSI. In this example, it is assumed that the 16 A-CSI CSI-RS ports are aggregated from two 8 port Rel-12 CSI-RS configurations. It may be observed that this P-CSI CSI-RS port mapping differs from Rel-12 4 port mappings, and may allow the P-CSI to be mapped to 4 non-consecutive ports of a larger array, such as an 8 port array using Rel-12 CSI-RS resource definitions or a 16 port array using aggregated Rel-12 8 port resources.

In one example where P-CSI CSI-RS ports may be selected from CSI-RS ports assigned to A-CSI CSI-RS, a list $\mathcal{L}$ of indices of ports to be used for P-CSI may be signaled from the eNB to the UE using higher layer signaling, such as RRC or MAC control elements. In one approach, the list $\mathcal{L}$ may be represented as pairs of integers (i,j), with each pair corresponding to an (l,m). For example, the 4 ports for P-CSI selected from the 4×2 port layout used for A-CSI pictured in FIG. 11(b) may be signaled with $\mathcal{L}$ using the following form $\mathcal{L} = \{(0,1), (0,3)\}$. Alternatively, if a single set of port numbers is used for the +45° and −45° polarizations, as is shown in FIG. 11, the A-CSI CSI-RS port numbers may be numbered consecutively across the entire array. In this case, the list $\mathcal{L}$ may be represented as an M/2 long bitmap with each element of the bitmap corresponding to one polarization of A-CSI CSI-RS port pair. In this case, the ports selected for P-CSI from the 4×2 port layout used for A-CSI pictured in FIG. 11(b) may be represented with $\mathcal{L} = \{01010000\}$, where the elements of the list correspond to ports 0-7 in that order.

In an alternative, the list of P-CSI CSI-RS ports $\mathcal{L}$ may be represented using a bitmapped matrix L, where each element of L may correspond to a dual polarized port pair used for A-CSI, and may be a '1' if the port pair is used for P-CSI or a '0' if the port pair is not used for P-CSI. The rows and columns of L may correspond to the maximum row and column port numbers, respectively, for the A-CSI CSI-RS ports. For example, for the ports selected for P-CSI from the 4×2 A-CSI port layout pictured in FIG. 11(b), a 4×2 matrix L using the following form may be used:

$$L = \begin{bmatrix} 1 & 0 \\ 0 & 0 \\ 1 & 0 \\ 0 & 0 \end{bmatrix}.$$

In addition to indicating which ports are used for P-CSI, different port numbers may be assigned for P-CSI than for A-CSI, allowing smaller precoding codebooks to be used for P-CSI than for A-CSI. In an example where a single set of port numbers may be used for the +45° and −45° polarizations, the P-CSI CSI-RS port indices may be incremented by 1 for each A-CSI CSI-RS port used by a P-CSI CSI-RS port in $\mathcal{L}$. In this case, the P-CSI CSI-RS port p(l) that corresponds to A-CSI CSI-RS port l may be:

$$p(l) = \sum_{i=0}^{l} \mathcal{L}(i) \qquad \text{Equation 1}$$

Where $\mathcal{L}$ (i) is the i$^{th}$ element of the list.

If the A-CSI CSI-RS ports may be indexed two dimensionally in a list $\mathcal{L}$, the P-CSI CSI-RS port number corresponding to horizontal and vertical element position index pair (l, m) may be determined for the +45° and −45° polarizations using Equation 2 and Equation 3, respectively:

$$p^{+45}(l, m) = \sum_{j=0}^{m} \sum_{i=0}^{l} \delta((i, j) \in \mathcal{L}) \qquad \text{Equation 2}$$

$$p^{-45}(l, m) = p^{+45}(l, m) + \sum_{j=0}^{M_{max0}} \sum_{i=0}^{L_{max0}} \delta((i, j) \in \mathcal{L}) \qquad \text{Equation 3}$$

Where $$\delta((i, j) \in \mathcal{L}) = \begin{cases} 1; & (i, j) \in \mathcal{L} \\ 0; & \text{Otherwise} \end{cases}$$

$M_{max0}$ and $L_{max0}$ are the maximum row and column port numbers, respectively, for the A-CSI CSI-RS ports.

When the P-CSI CSI-RS ports are identified with a bitmapped matrix L, the P-CSI port number may be determined as $$p(l, m)^{+45} = \sum_{j=0}^{m} \sum_{i=0}^{l} L(i, j) \qquad \text{Equation 4}$$

$$p(l, m)^{-45} = p(l, m)^{+45} + \sum_{j=0}^{M_{max}-1} \sum_{i=0}^{L_{max}-1} L(i, j) \qquad \text{Equation 5}$$

Where
L(i, j) is the element in row i and column j of L
$M_{max0}$ and $L_{max0}$ are the maximum row and column port numbers, respectively, for the A-CSI CSI-RS ports.

Example Group 4

Figure 13:
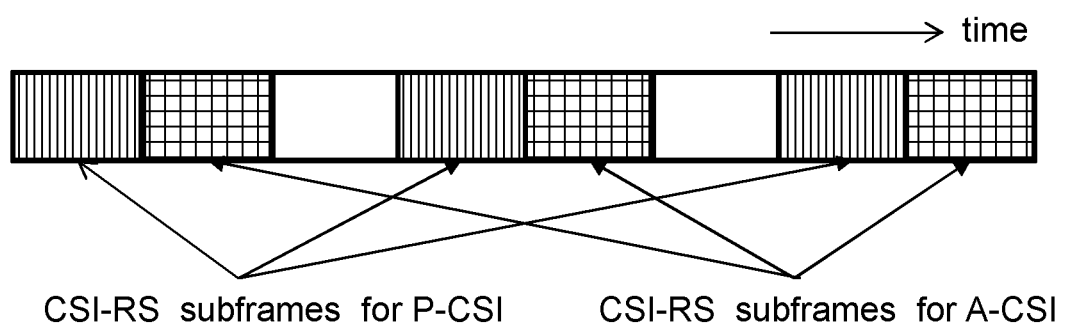
FIG. 13 is a schematic diagram illustrating an example of separate CSI-RS resources for P-CSI and A-CSI reporting, according to embodiments herein.

In this example group, a separate CSI-RS resource may be configured for P-CSI. An example is shown in FIG. 13, which is a schematic diagram illustrating an example of separate CSI-RS resources for P-CSI and A-CSI reporting. In this Figure, each box represents a subframe. Some subframes comprise CSI-RS resource for P-CSI, some for A-CSI. Hence, CSI-RS resources for periodic reporting and aperiodic reporting may be separate, that is, separately allocated. To have smaller number of antenna ports for P-CSI, precoding may be applied to the CSI-RS in the vertical dimension of a 2D antenna array that may be configured for A-CSI, which may result in a 1D CSI-RS ports in the horizontal dimension. A UE may measure on the 1D CSI-RS ports and may perform periodic CSI feedback.

The precoding may provide additional vertical beamforming gain, and thus better array gain, and therefore higher user throughput and system capacity. By the precoding combining multiple antenna ports, that is beamforming, in the vertical direction to form a new antenna port for P-CSI, the new antenna port may have a narrower beam pattern and thus a higher gain than the original antenna port.

In summary, embodiments herein may relate to periodic CSI reports using measurements on fewer, or more generally different or different number of, RS ports than the aperiodic CSI (A-CSI) reports. Different port to (sub)element virtualizations may be used for P-CSI reports than for A-CSI reports.

One advantage of embodiments herein is that they allow to maintain low eNB and UE complexity, e.g., low as in legacy, for the periodic reporting and save energy both at the network node 210 and at the wireless device 250. Different port to (sub)element virtualization may be used to increase the transmit power on the RS ports used for P-CSI reports.

Selected examples of a method in the wireless communications network 200, associated to embodiments herein may relate to the following:

Example 1

A method for channel state information reporting, comprising:
a. Configuring, by a network node, a UE with a first set of M' CSI-RS ports for periodic CSI reporting and a second set of M CSI-RS ports for aperiodic CSI reporting;
b. Transmitting, by the network node, a first CSI-RS periodically over the first set of CSI-RS ports and a second CSI-RS over the second set of CSI-RS ports;
c. Measuring and Periodically reporting, by the UE, a first CSI according to the first set of CSI-RS ports;
d. Measuring and aperiodically reporting, by the UE, a second CSI according to the second set of CSI-RS ports.

Example 2

The method of selected example 1, where M'<M.

Example 3

The method of selected example 1, wherein the configuring is through RRC signaling.

Example 4

The method of selected example 1, wherein the second set of CSI-RS ports are only transmitted when triggered, and the UE only performs A-CSI measurements when it has received the trigger from the eNB.

Example 5

The method of selected example 1, wherein the second set of CSI-RS ports consists of a number of vertical CSI_RS ports and/or a number of horizontal CSI-RS ports.

Example 6

The method of selected example 1, wherein the first set of CSI-RS ports is a subset of the second set of CSI-RS ports.

Example 7

Some examples may relate to assigning port numbers to P-CSI when the P-CSI port numbers differ from the A-CSI port numbers. Therefore, another selected example may be the method of selected example 0, further comprising configuring the UE to report periodic CSI using a precoding codebook, and indexing each of the ports in the first set of CSI-RS ports with a port number, the port numbers corresponding to ports used in the precoding codebook.

Example 8

In some examples, P-CSI may be an aggregation of non-contiguous A-CSI ports. Therefore, another selected example may be the method of selected example 1, wherein the first set of CSI-RS ports comprises an aggregation of multiple subsets of the second set of CSI-RS ports.

Example 9

In some examples, P-CSI and A-CSI resources may be allocated independently, but P-CSI resources may be an aggregation of some of the A-CSI resources. Therefore, another selected example may be the method of selected example 1, wherein the CSI-RS resources corresponding to the first set of CSI-RS ports comprise an aggregation of multiple subsets of CSI-RS resources corresponding to the second set of CSI-RS ports.

Example 10

The method of selected example 1, wherein the first set of CSI-RS is obtained by precoding of the second set of CSI-RS ports in either vertical or horizontal dimension Example 11

The method of selected example 1, wherein the first set of CSI-RS is obtained by decimating of the second set of CSI-RS ports in either vertical, horizontal or both dimensions Example 12

The method of selected example 1, wherein the measuring a second CSI according to the second set of CSI-RS ports comprises estimating the channel state information based on a new 2D LTE downlink codebook.

Example 13

The method of selected example 12, wherein the new 2D LTE downlink codebook is different from any of the existing LTE downlink codebooks.

To perform the method actions described above in relation to FIGS. 8, 9, 11, 12 and 13, the network node 210 is configured to indicate to the wireless device 250 the first set of antenna ports and the second set of antenna ports. The network node 210 may comprise the following arrangement depicted in FIG. 14. As stated earlier, the network node 210 and the wireless device 120 are configured to operate in the wireless communications network 200.

The detailed description of some of the following corresponds to the same references provided above, in relation to the actions described for the network node 210, and will thus not be repeated here.

The network node 210 is further configured to, e.g. by means of an indicating module 1401 configured to, indicate to a wireless device 250 at least one of: a) the first indication of the first set, M', of antenna ports for the first measurements by the wireless device 250 on first radio signals, the first measurements being associated with the periodic reporting by the wireless device 250, and b) the second indication of the second set, M, of antenna ports for second measurements by the wireless device 250 on the second radio signals, the second measurements being associated with the aperiodic reporting by the wireless device 250. The first set of antenna ports is different than the second set of antenna ports, and the periodic reporting and the aperiodic reporting correspond to a same CSI process. The indicating module 1401 may be a processor 1408 of the network node 210, or an application running on such processor. The indicating module 1401 may be within the network node 210.

In some embodiments, the radio signals may be configured to be RS, and to indicate may be configured to be based on the capability of the wireless device 250, the capability being related to the supported number of antenna ports in the CSI process.

The first set of antenna ports may be different than the second set of antenna ports in that at least one of: a) the first set of antenna ports is configured to have a first virtualization and the second set of antenna ports is configured to have a second virtualization, b) the first set of antenna ports is configured to comprise fewer antenna ports than the second set of antenna ports; c) the first set of antenna ports is configured to be a subset of the second set of antenna ports, d) the first set of antenna ports is configured to be obtained by precoding of the second set of antenna ports in a vertical dimension or a horizontal dimension, e) the first set of antenna ports is configured to be obtained by decimating of the second set of antenna ports in either a vertical dimension, a horizontal dimension, or both dimensions, and f) the first set of antenna ports is configured to comprise an aggregation of multiple subsets of the second set of antenna ports.

The network node 210 may be further configured to, e.g., by means of a transmitting module 1402 configured to, transmit, to the wireless device 250, the first radio signals, periodically, over the first set of antenna ports and the second radio signals over the second set of antenna ports. The transmitting module 1402 may be a processor 1408 of the network node 210, or an application running on such processor. The transmitting module 1402 may be within the network node 210.

In some embodiments, e.g., wherein the network node 210 may be further configured to, e.g., by means of an obtaining module 1403 configured to, obtain at least one of: the first set of antenna ports and the second set of antenna ports, wherein the first indication is of the first set of antenna ports configured to be obtained, and the second indication is of the second set of antenna ports configured to be obtained, and wherein to transmit the first radio signals is configured to be performed over the first set of antenna ports configured to be obtained and to transmit the second radio signals is configured to be performed over the second set of antenna ports configured to be obtained. The obtaining module 1403 may be a processor 1408 of the network node 210, or an application running on such processor. The obtaining module 1403 may be within the network node 210.

In some embodiments, e.g., wherein the first report corresponds to the first measurements on the first radio signals configured to be transmitted over the first set of antenna ports, the first report being configured to be received according to the periodic reporting type, the network node 210 may be further configured to, e.g., by means of a sending module 1404 configured to, send the third indication to the wireless device 250. The third indication may be configured to trigger the wireless device 250 to send the second report corresponding to the second measurements on the second radio signals, the second report being configured to be sent according to the aperiodic reporting. The sending module 1404 may be a processor 1408 of the network node 210, or an application running on such processor. The sending module 1404 may be within the network node 210.

In some embodiments, the network node 210 may be further configured to, e.g., by means of a receiving module 1405 configured to, receive the second report from the wireless device 250. The receiving module 1405 may be the processor 1408 of the network node 210, or an application running on such processor. The receiving module 1405 may be within the network node 210.

In some embodiments, e.g., wherein to indicate further comprises to indicate a fourth indication for the wireless device 250 to send the first report corresponding to the first measurements on the first radio signals according to the periodic reporting, and to send the first report using the precoding codebook, wherein the first set of antenna ports is a subset of the second set of antenna ports, the network node 210 may be further configured to, e.g., by means of an indexing module 1406 configured to, index each of the ports in the first set of antenna ports with an antenna port number, the antenna port numbers corresponding to antenna ports configured to be used in the precoding codebook. The indexing module 1406 may be a processor 1408 of the network node 210, or an application running on such processor. The indexing module 1406 may be within the network node 210.

CSI-RS resources for periodic reporting and aperiodic reporting may be configured to be separately allocated.

Other modules 1407 may be comprised in the network node 210. The other modules 1407 may be the processor 1308 of the network node 210, or an application running on such processor.

Figure 14:
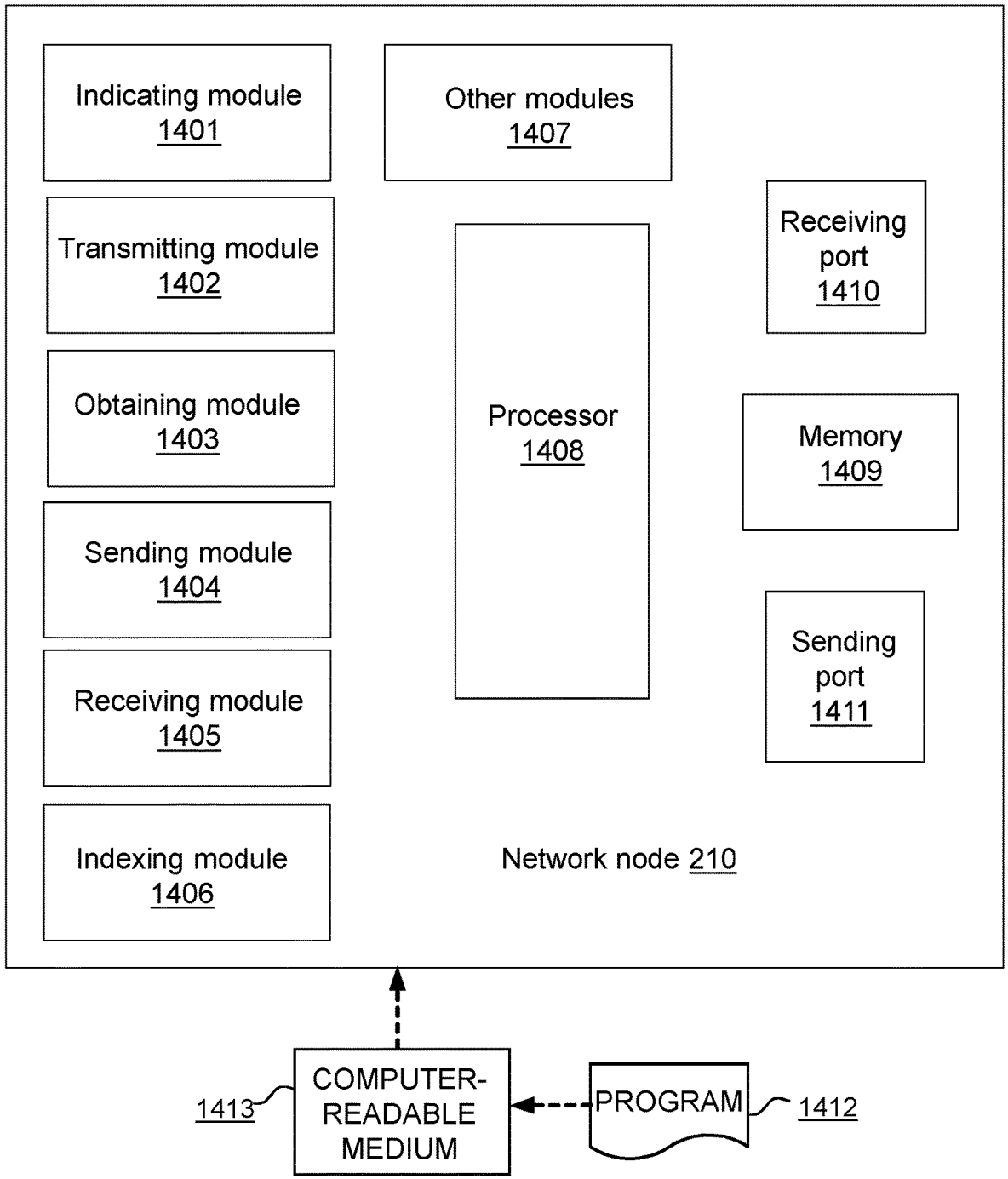
FIG. 14 is a schematic block diagram illustrating embodiments of a network node, according to embodiments herein.

The embodiments herein in the network node 210 may be implemented through one or more processors, such as a processor 1408 in the network node 210 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the network node 210. One such carrier may be in the form of a CD ROM disc. It is however feasible with other data carriers such as a memory stick. The computer program code may furthermore be provided as pure program code on a server and downloaded to the network node 210.

The network node 210 may further comprise a memory 1409 comprising one or more memory units. The memory 1409 is arranged to be used to store obtained information, store data, configurations, schedulings, and applications etc. to perform the methods herein when being executed in the network node 210.

The network node 210 may comprise an interface unit to facilitate communications between the network node 210 and other nodes or devices, e.g., the wireless device 250. The interface may, for example, include a transceiver configured to transmit and receive radio signals over an air interface in accordance with a suitable standard.

In some embodiments, the network node 210 may receive information from, e.g., the wireless device 250, through a receiving port 1410. In some embodiments, the receiving port 1410 may be, for example, connected to one or more antennas in network node 210. In other embodiments, the network node 210 may receive information from another structure in the wireless communications network 200 through the receiving port 1410. Since the receiving port 1410 may be in communication with the processor 1408, the receiving port 1410 may then send the received information to the processor 1408. The receiving port 1410 may also be configured to receive other information.

The processor 1408 in the network node 210 may be further configured to transmit or send information to e.g., the wireless device 250, through a sending port 1411, which may be in communication with the processor 1408, and the memory 1409.

Those skilled in the art will also appreciate that the indicating module 1401, the transmitting module 1402, the obtaining module 1403, the sending module 1404, the receiving module 1405, the indexing module 1406 and the other modules 1407 described above may refer to a combination of analog and digital modules, and/or one or more processors configured with software and/or firmware, e.g., stored in memory, that, when executed by the one or more processors such as the processor 1408, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1401-1407 described above may be implemented as one or more applications running on one or more processors such as the processor 1408.

Thus, the methods according to the embodiments described herein for the network node 210 may be respectively implemented by means of a computer program 1412 product, comprising instructions, i.e., software code portions, which, when executed on at least one processor 1408, cause the at least one processor 1408 to carry out the action described herein, as performed by the network node 210. The computer program 1412 product may be stored on a computer-readable storage medium 1413. The computer-readable storage medium 1413, having stored thereon the computer program 1412, may comprise instructions which, when executed on at least one processor 1408, cause the at least one processor 1408 to carry out the action described herein, as performed by the network node 210. In some embodiments, the computer-readable storage medium 1413 may be a non-transitory computer-readable storage medium, such as a CD ROM disc, or a memory stick. In other embodiments, the computer program 1412 product may be stored on a carrier containing the computer program 1412 just described, wherein the carrier is one of an electronic signal, optical signal, radio signal, or the computer-readable storage medium 1413, as described above.

To perform the method actions described above in relation to FIG. 10, the wireless device 250 is configured to configure the wireless device 250 with the first set of antenna ports, and the second set of antenna ports. The wireless device 250 may comprise the following arrangement depicted in FIG. 15. As stated earlier, the wireless device 250 is configured to operate in the wireless communications network 200.

The detailed description of some of the following corresponds to the same references provided above, in relation to the actions described for the wireless device 250, and will thus not be repeated here.

The wireless device 250 is further configured to, e.g., by means of a receiving module 1501 configured to, receive from a network node 210, at least one of: a) the first indication of the first set, M', of antenna ports for the first measurements by the wireless device 250 on the first radio signals, the first measurements being associated with the periodic reporting by the wireless device 250, and b) the second indication of the second set, M, of antenna ports for the second measurements by the wireless device 250 on the second radio signals, the second measurements being associated with the aperiodic reporting by the wireless device 250. The first set of antenna ports is different than the second set of antenna ports. The periodic reporting and the aperiodic reporting correspond to a same CSI process. The receiving module 1501 may be a processor 1506 of the wireless device 250, or an application running on such processor. The receiving module 1501 may be within the wireless device 250.

In some embodiments, the reporting may comprise reporting of CSI, wherein the radio signals may be configured to be RS, and wherein to receive may be based on the capability of the wireless device 250, the capability being related to the supported number of antenna ports in a CSI process.

In some embodiments, the wireless device 250 may be further configured to, e.g., by means of the receiving module 1501 further configured to, receive, from the network node 210, the first radio signals over the first set of antenna ports and the second radio signals over the second set of antenna ports.

In some embodiments, the wireless device 250 may be further configured to, e.g., by means of the receiving module 1501 further configured to, receive the third indication from the network node 210, wherein to send the second report corresponding to the second measurements on the second radio signals is configured to be triggered by the third indication configured to be received, the second report being configured to be sent according to the aperiodic reporting.

In some embodiments, the first set of antenna ports may be different than the second set of antenna ports in that at least one of: a) the first set of antenna ports is configured to have a first virtualization and the second set of antenna ports is configured to have a second virtualization, b) the first set of antenna ports is further configured to comprise fewer antenna ports than the second set of antenna ports; c) the first set of antenna ports is configured to be a subset of the second set of antenna ports; d) the first set of antenna ports is configured to be obtained by precoding of the second set of antenna ports in a vertical dimension or a horizontal dimension; e) the first set of antenna ports is configured to be obtained by decimating of the second set of antenna ports in either a vertical dimension, a horizontal dimension, or both dimensions; and f) the first set of antenna ports is configured to comprise an aggregation of multiple subsets of the second set of antenna ports.

To receive may be further configured to comprise receiving the fourth indication indicating to the wireless device 250 to send the first report corresponding to the first measurements on the first radio signals according to the periodic reporting, and to send the first report using the precoding codebook.

The wireless device 250 is further configured to, e.g., by means of a configuring module 1502 configured to, configure the wireless device 250 with the first set of antenna ports, and the second set of antenna ports, according to the at least one of: the first indication and the second indication, which is configured to be received. The configuring module 1502 may be the processor 1506 of the wireless device 250, or an application running on such processor. The configuring module 1501 may be within the wireless device 250.

The wireless device 250 may be further configured to, e.g., by means of a sending module 1503 configured to, send, to the network node 210, a) the first report corresponding to the first measurements on the first radio signals configured to be received over the first set of antenna ports, the first report being configured to be sent according to the periodic reporting, and b) the second report, corresponding to the second measurements on the second radio signals configured to be received over the second set of antenna ports, the second report being configured to be sent according to the aperiodic reporting. The sending module 1503 may be the processor 1506 of the wireless device 250, or an application running on such processor. The sending module 1503 may be within the wireless device 250.

The wireless device 250 may be further configured to, e.g., by means of a measuring module 1504 configured to, measure the received first radio signals according to the first set of antenna ports. The measuring module 1504 may be the processor 1506 of the wireless device 250, or an application running on such processor. The measuring module 1504 may be within the wireless device 250.

The wireless device 250 may be further configured to, e.g., by means of the measuring module 1504 configured to, measure the received second radio signals, the measuring the received second radio signals being according to the second set of antenna ports and comprising estimating information about a radio channel between the wireless device 250 and the network node 210, based on the downlink codebook for the extended set of antenna ports. The measuring module 1504 may be the processor 1506 of the wireless device 250, or an application running on such processor. The measuring module 1504 may be within the wireless device 250.

Other modules 1505 may be comprised in the wireless device 250. The other modules 1505 may be a processor 1506 of the wireless device 250, or an application running on such processor.

Figure 15:
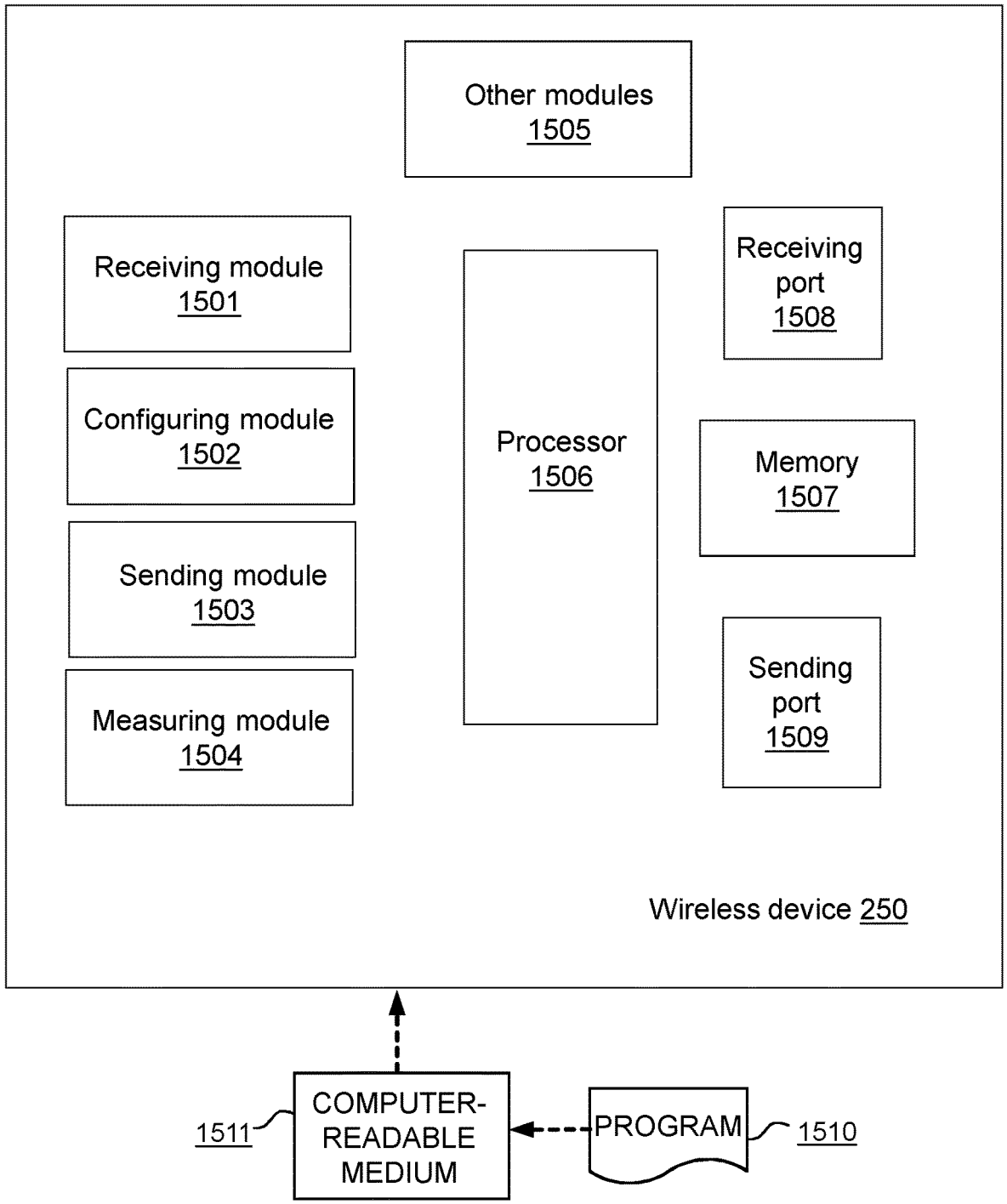
FIG. 15 is a schematic block diagram illustrating embodiments of a wireless device, according to embodiments herein.

The embodiments herein may be implemented through one or more processors, such as a processor 1506 in the wireless device 250 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the in the wireless device 250. One such carrier may be in the form of a CD ROM disc. It is however feasible with other data carriers such as a memory stick. The computer program code may furthermore be provided as pure program code on a server and downloaded to the wireless device 250.

The wireless device 250 may further comprise a memory 1507 comprising one or more memory units. The memory 1507 is arranged to be used to store obtained information, store data, configurations, schedulings, and applications etc. to perform the methods herein when being executed in the wireless device 250.

The wireless device 250 may comprise an interface unit to facilitate communications between the wireless device 250 and other nodes or devices, e.g., the network node 210. The interface may, for example, include a transceiver configured to transmit and receive radio signals over an air interface in accordance with a suitable standard.

In some embodiments, the wireless device 250 may receive information from the network node 210, through a receiving port 1508. In some embodiments, the receiving port 1508 may be, for example, connected to one or more antennas in wireless device 250. In other embodiments, the wireless device 250 may receive information from another structure in the wireless communications network 200 through the receiving port 1508. Since the receiving port 1508 may be in communication with the processor 1506, the receiving port 1508 may then send the received information to the processor 1506. The receiving port 1508 may also be configured to receive other information.

The processor 1506 in the wireless device 250 may be further configured to transmit or send information to e.g., the network node 210, through a sending port 1509, which may be in communication with the processor 1506, and the memory 1507.

Those skilled in the art will also appreciate that the receiving module 1501, the configuring module 1502, the sending module 1503, the measuring module 1504, and the other modules 1505 described above may refer to a combination of analog and digital modules, and/or one or more processors configured with software and/or firmware, e.g., stored in memory, that, when executed by the one or more processors such as the processor 1506, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1501-1505 described above may be implemented as one or more applications running on one or more processors such as the processor 1506.

Thus, the methods according to the embodiments described herein for the wireless device 250 may be respectively implemented by means of a computer program 1510 product, comprising instructions, i.e., software code portions, which, when executed on at least one processor 1506, cause the at least one processor 1506 to carry out the actions described herein, as performed by the wireless device 250. The computer program 1510 product may be stored on a computer-readable storage medium 1511. The computer-readable storage medium 1511, having stored thereon the computer program, may comprise instructions which, when executed on at least one processor 1506, cause the at least one processor 1506 to carry out the actions described herein, as performed by the wireless device 250. In some embodiments, the computer-readable storage medium 1511 may be a non-transitory computer-readable storage medium 1511, such as a CD ROM disc, or a memory stick. In other embodiments, the computer program 1510 product may be stored on a carrier containing the computer program just described, wherein the carrier is one of an electronic signal, optical signal, radio signal, or the computer-readable storage medium 1511, as described above.

When using the word "comprise" or "comprising" it shall be interpreted as non-limiting, i.e. meaning "consist at least of".

Embodiments herein may relate to "2D beamforming", "CSI feedback", and PUCCH.

The embodiments herein are not limited to the above described preferred embodiments. Various alternatives, modifications and equivalents may be used. Therefore, the above embodiments should not be taken as limiting the scope of the invention.

The invention claimed is:

1. A method performed by a network node to indicate to a wireless device a first set of antenna ports and a second set of antenna ports, the method comprising:
   indicating to the wireless device at least one of:
      a first indication of the first set of antenna ports for first measurements by the wireless device on first radio signals, the first measurements being associated with periodic reporting by the wireless device, and
      a second indication of the second set (M) of antenna ports for second measurements by the wireless device on second radio signals, the second measurements being associated with aperiodic reporting by the wireless device,
      wherein the first set of antenna ports is different than the second set of antenna ports, wherein the first set of antenna ports are obtained by precoding of the second set of antenna ports in a vertical dimension of a 2 dimensional (2D) antenna array configured for aperiodic reporting to form a 1 dimensional (1D) antenna array in a horizontal dimension for periodic reporting, wherein the first set of antenna ports has a narrower beam pattern than the second set of antenna ports, and wherein the periodic reporting and the aperiodic reporting correspond to a same Channel State Information (CSI) process; and
   transmitting, to the wireless device, the first radio signals, periodically, over the first set of antenna ports and the second radio signals over the second set of antenna ports.

2. The method according to claim 1, wherein the first and second radio signals are Reference Signals (RS), and wherein the indicating is based on a capability of the wireless device, the capability being related to a supported number of antenna ports in a CSI process.

3. The method according to claim 1, further comprising:
   obtaining at least one of: the first set of antenna ports and the second set of antenna ports, and
   wherein the first indication is of the obtained first set of antenna ports, and the second indication is of the obtained second set of antenna ports, and
   wherein the transmitting of the first radio signals is performed over the obtained first set of antenna ports and the transmitting of the second radio signals is performed over the obtained second set of antenna ports.

4. The method according to claim 1, wherein the first set of antenna ports is different than the second set of antenna ports in that at least one of:
   the first set of antenna ports has a first virtualization and the second set of antenna ports has a second virtualization,
   the first set of antenna ports comprises fewer antenna ports than the second set of antenna ports;
   the first set of antenna ports is a subset of the second set of antenna ports,
   the first set of antenna ports are obtained by decimating of the second set of antenna ports in either a vertical dimension, a horizontal dimension, or both dimensions, and
   the first set of antenna ports comprises an aggregation of multiple subsets of the second set of antenna ports.

5. The method according to claim 1, wherein a first report corresponds to the first measurements on the first radio signals transmitted over the first set of antenna ports, the first report being received according to the periodic reporting, and wherein the method further comprises:
   sending a third indication to the wireless device, the third indication triggering the wireless device to send a second report corresponding to the second measurements on the second radio signals, the second report being sent according to the aperiodic reporting, and
   receiving the second report from the wireless device.

6. The method according to claim 1, wherein the indicating further comprises a fourth indication for the wireless device to send a first report corresponding to the first measurements on the first radio signals according to the periodic reporting, and to send the first report using a precoding codebook, wherein the first set of antenna ports is a subset of the second set of antenna ports, and wherein the method further comprises:
   indexing each of the ports in the first set of antenna ports with an antenna port number, the antenna port numbers corresponding to antenna ports used in the precoding codebook.

7. The method according to claim 1, wherein the first set of antenna ports, which is assigned a first set of time-frequency resources, has a first virtualization, and a second set of antenna ports, which is assigned a second set of time-frequency resources, has a second virtualization.

8. A method performed by a wireless device to configure the wireless device with a first set of antenna ports, and a second set of antenna ports, the method comprising:
   receiving from a network node, at least one of:
      a first indication of the first set of antenna ports for first measurements by the wireless device on first radio signals, the first measurements being associated with periodic reporting by the wireless device; and
      a second indication of the second set of antenna ports for second measurements by the wireless device on second radio signals, the second measurements being associated with aperiodic reporting by the wireless device,
      wherein the first set of antenna ports is different than the second set of antenna ports, wherein the first set of antenna ports are obtained by precoding of the second set of antenna ports in a vertical dimension of a 2 dimensional (2D) antenna array configured for aperiodic reporting to form a 1 dimensional (1D) antenna array in a horizontal dimension for periodic reporting, wherein the first set of antenna ports has a narrower beam pattern than the second set of antenna ports, and wherein the periodic reporting and the aperiodic reporting correspond to a same Channel State Information (CSI) process; and
   receiving, from the network node, the first radio signals, periodically, over the first set of antenna ports and the second signals over the second set of antenna ports; and
   configuring the wireless device with the first set of antenna ports, and the second set of antenna ports, according to the received at least one of: the first indication and the second indication.

9. The method according to claim 8, wherein the reporting comprises reporting of Channel State Information (CSI), wherein the first and second radio signals are Reference Signals (RS), and wherein the receiving the at least one of the first indication and the second indication is based on a capability of the wireless device, the capability being related to a supported number of antenna ports in a CSI process.

10. The method according to claim 8, further comprising:
sending, to the network node, a first report corresponding to the first measurements on the first radio signals received over the first set of antenna ports, the first report being sent according to the periodic reporting, and a second report corresponding to the second measurements on the second radio signals received over the second set of antenna ports, the second report being sent according to the aperiodic reporting.

11. The method according to claim 10, further comprising:
receiving a third indication from the network node, wherein the sending of the second report corresponding to the second measurements on the second radio signals is triggered by the received third indication, the second report being sent according to the aperiodic reporting.

12. The method according to claim 8, wherein the first set of antenna ports is different than the second set of antenna ports in that at least one of:
the first set of antenna ports has a first virtualization and the second set of antenna ports has a second virtualization,
the first set of antenna ports comprises fewer antenna ports than the second set of antenna ports;
the first set of antenna ports is a subset of the second set of antenna ports;
the first set of antenna ports is obtained by decimating of the second set of antenna ports in either a vertical dimension, a horizontal dimension, or both dimensions; and
the first set of antenna ports comprises an aggregation of multiple subsets of the second set of antenna ports.

13. The method according to claim 8, wherein the receiving the at least one of the first indication and second indication further comprises receiving a fourth indication indicating to the wireless device to send the first report corresponding to the first measurements on the first radio signals according to the periodic reporting, and to send the first report using a precoding codebook.

14. A network node configured to indicate to a wireless device a first set of antenna ports and a second set of antenna ports, the network node comprising at least one processor, wherein the at least one processor is further configured to:
indicate, to the wireless device, at least one of:
a first indication of a first set of antenna ports for first measurements by the wireless device on first radio signals, the first measurements being associated with periodic reporting by the wireless device, and
a second indication of a second set of antenna ports for second measurements by the wireless device on second radio signals, the second measurements being associated with aperiodic reporting by the wireless device,
wherein the first set of antenna ports is different than the second set of antenna ports, wherein the first set of antenna ports are obtained by precoding of the second set of antenna ports in a vertical dimension of a 2 dimensional (2D) antenna array configured for aperiodic reporting to form a 1 dimensional (1D) antenna array in a horizontal dimension for periodic reporting, wherein the first set of antenna ports has a narrower beam pattern than the second set of antenna ports, and wherein the periodic reporting and the aperiodic reporting correspond to a same Channel State Information (CSI) process, and
transmit, to the wireless device, the first radio signals, periodically, over the first set of antenna ports and the second radio signals over the second set of antenna ports.

15. The network node according to claim 14, wherein the first and second radio signals are configured to be Reference Signals (RS), and wherein the at least one processor is configured to indicate to the wireless device based on a capability of the wireless device, the capability being related to a supported number of antenna ports in a CSI process.

16. The network node according to claim 14, wherein the at least one processor is further configured to:
obtain at least one of: the first set of antenna ports and the second set of antenna ports,
wherein the first indication is of the obtained first set of antenna ports and the second indication is of the obtained second set of antenna ports, and
wherein transmission of the first radio signals is performed over the obtained first set of antenna ports and the transmission of the second radio signals is performed over the obtained second set of antenna ports.

17. The network node according to claim 14, wherein the first set of antenna ports is different than the second set of antenna ports in that at least one of:
the first set of antenna ports is configured to have a first virtualization and the second set of antenna ports is configured to have a second virtualization,
the first set of antenna ports is configured to comprise fewer antenna ports than the second set of antenna ports;
the first set of antenna ports is configured to be a subset of the second set of antenna ports,
the first set of antenna ports is configured to be obtained by decimating of the second set of antenna ports in either a vertical dimension, a horizontal dimension, or both dimensions, and
the first set of antenna ports is configured to comprise an aggregation of multiple subsets of the second set of antenna ports.

18. A wireless device configured to configure the wireless device with a first set of antenna ports, and a second set of antenna ports, the wireless device being further configured to:
receive from a network node, at least one of:
a first indication of a first set of antenna ports for first measurements by the wireless device on first radio signals, the first measurements being associated with periodic reporting by the wireless device, and
a second indication of a second set of antenna ports for second measurements by the wireless device on second radio signals, the second measurements being associated with aperiodic reporting by the wireless device,
wherein the first set of antenna ports is different than the second set of antenna ports, wherein the first set of antenna ports are obtained by precoding of the second set of antenna ports in a vertical dimension of a 2 dimensional (2D) antenna array configured for aperiodic reporting to form a 1 dimensional (1D) antenna array in a horizontal dimension for periodic reporting, wherein the first set of antenna ports has a narrower beam pattern than the second set of antenna ports, and wherein the periodic reporting and the aperiodic reporting correspond to a same Channel State Information (CSI) process, and receive, from the network node, the first radio signals, periodically, over the first set of antenna ports and the second radio signals over the second set of antenna ports, and configure the wireless device with the first set of antenna ports, and the second set of antenna ports, according to the at least one of: the first indication and the second indication.

19. The wireless device according to claim 18, wherein the reporting comprises reporting of CSI, wherein the first and second radio signals are Reference Signals (RS), and wherein the wireless device is configured to receive at least one of the first indication and the second indication, from the network node, based on a capability of the wireless device, the capability being related to a supported number of antenna ports in a CSI process.

20. The wireless device according to claim 18, wherein the wireless device is further configured to:

send, to the network node, a first report corresponding to the first measurements on the first radio signals received over the first set of antenna ports, the first report being sent according to the periodic reporting, and a second report corresponding to the second measurements on the second radio signals received over the second set of antenna ports, the second report being sent according to the aperiodic reporting.

21. The wireless device according to claim 20, wherein the wireless device is further configured to:

receive a third indication from the network node, wherein to send the second report, corresponding to the second measurements on the second radio signals, the at least one processor is further configured to be triggered by the received third indication, and wherein the second report is sent according to the aperiodic reporting.

22. The wireless device according to claim 18, wherein the first set of antenna ports is different than the second set of antenna ports in that at least one of:

the first set of antenna ports is configured to have a first virtualization and the second set of antenna ports is configured to have a second virtualization, the first set of antenna ports is further configured to comprise fewer antenna ports than the second set of antenna ports;

the first set of antenna ports is configured to be a subset of the second set of antenna ports;

the first set of antenna ports is configured to be obtained by decimating of the second set of antenna ports in either a vertical dimension, a horizontal dimension, or both dimensions; and the first set of antenna ports is configured to comprise an aggregation of multiple subsets of the second set of antenna ports.

* * * * *